US011881155B2

(12) United States Patent
Yuan

(10) Patent No.: US 11,881,155 B2
(45) **Date of Patent: *Jan. 23, 2024**

(54) DISPLAY PANEL AND DISPLAY DEVICE

(71) Applicant: Xiamen Tianma Micro-Electronics Co., Ltd., Xiamen (CN)

(72) Inventor: Yong Yuan, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,526

(22) Filed: Nov. 28, 2022

(65) Prior Publication Data

US 2023/0087491 A1 Mar. 23, 2023

Related U.S. Application Data

(63) Continuation of application No. 17/405,993, filed on Aug. 18, 2021, now Pat. No. 11,538,401.

(30) Foreign Application Priority Data

Oct. 15, 2020 (CN) ........................ 202011104404.7

(51) Int. Cl.
*G09G 3/32* (2016.01)

(52) U.S. Cl.
CPC ......... *G09G 3/32* (2013.01); *G09G 2300/043* (2013.01); *G09G 2300/0819* (2013.01);
(Continued)

(58) Field of Classification Search
CPC ...... G09G 3/32–3291; G09G 2300/0421–043; G09G 2300/0809; G09G 2300/0819; G09G 2300/0842; G09G 2300/0861; G09G 2300/0866; G09G 2310/0264; G09G 2310/027; G09G 2310/0272; G09G 2310/0289; G09G 2310/06; G09G 2310/067; G09G 2310/08; G09G 2320/0233; G09G 2320/029;
(Continued)

(56) References Cited

U.S. PATENT DOCUMENTS

2014/0028648 A1* 1/2014 Park ..................... G09G 3/3233
345/76
2021/0118368 A1* 4/2021 In ......................... G09G 3/3275

FOREIGN PATENT DOCUMENTS

CN 111435587 A 7/2020
CN 111710299 A 9/2020

* cited by examiner

*Primary Examiner* — Nathan Danielsen
(74) *Attorney, Agent, or Firm* — KDW Firm PLLC

(57) ABSTRACT

Provided are a display panel and a display device. The display panel includes a pixel circuit and a light-emitting element. The pixel circuit includes a data write module, a drive module and a compensation module. The drive module includes a drive transistor; the data write module is connected to an input terminal of the drive module, a first electrode of the compensation module is connected to an output terminal of the drive module, and a second electrode of the compensation module is connected to a control terminal of the drive module. The data write module includes a data write transistor and a bias transistor, the data write transistor is connected to a data signal input terminal and configured to transmit a data signal, and the bias transistor is connected to a bias signal input terminal and configured to transmit a bias signal.

20 Claims, 19 Drawing Sheets

(52) U.S. Cl.
CPC .............. *G09G 2320/0233* (2013.01); *G09G 2320/045* (2013.01)

(58) Field of Classification Search
CPC ..... G09G 2320/0295; G09G 2320/043; G09G 2320/045
See application file for complete search history.

DISPLAY PANEL AND DISPLAY DEVICE

CROSS-REFERENCE TO RELATED APPLICATION

This is a continuation of U.S. patent application Ser. No. 17/405,993, filed Aug. 18, 2021, which claims priority to Chinese Patent Application No. 202011104404.7 filed Oct. 15, 2020, the disclosures of which are incorporated herein by reference in their entireties.

TECHNICAL FIELD

Embodiments of the present disclosure relate to a display technology and, in particular, to a display panel and a display device.

BACKGROUND

In a display panel, a pixel circuit provides a displaying-required drive current for a light-emitting element of the display panel and controls whether the light-emitting element enters a light emission stage. A pixel circuit is an indispensable element in most self-luminous display panels.

However, in an existing display panel, the internal characteristics of a drive transistor in a pixel circuit change slowly as the service time increases, causing the threshold voltage of the drive transistor to drift, thereby affecting the overall characteristics of the drive transistor and thus affecting the display uniformity.

SUMMARY

Embodiments of the present disclosure provide a display panel and a display device.

One aspect of embodiments of the present disclosure provides a display panel.

The display panel includes a pixel circuit and a light-emitting element.

The pixel circuit includes a drive module, a compensation module and a data write module.

The drive module includes a drive transistor.

The data write module is connected to an input terminal of the drive module.

A first electrode of the compensation module is connected to an output terminal of the drive module, and a second electrode of the compensation module is connected to a control terminal of the drive module.

The data write module includes a data write transistor and a bias transistor, the data write transistor is connected to a data signal input terminal and configured to transmit a data signal, and the bias transistor is connected to a bias signal input terminal and configured to transmit a bias signal.

An operation of the pixel circuit includes a bias stage, during the bias stage, the data write module and the drive module are on, the compensation module is off, and the data write module provides the bias signal.

A data write cycle of the display panel includes a data write frame and a retention frame.

The data write frame includes a data write stage in which the data write module writes a data signal to a gate of the drive transistor, and the retention frame does not include the data write stage.

At least one data write frame and/or at least one retention frame includes the bias stage; and a duration of the bias stage in at least one retention frame is greater than a duration of the bias stage in at least one data write frame.

Based on the same inventive concept, embodiments of the present disclosure further provide a display device. The display device includes the preceding display panel.

BRIEF DESCRIPTION OF DRAWINGS

In order that technical solutions in embodiments of the present disclosure or the related art are described more clearly, drawings to be used in the description of the embodiments or the related art are briefly described hereinafter. Apparently, while the drawings in the description are some embodiments of the present disclosure, for those skilled in the art, these drawings may be expanded and extended to other structures and drawings according to the basic concepts of the device structure, driving method and manufacturing method disclosed and indicated in embodiments of the present disclosure. These are undoubtedly all within the scope of the claims of the present disclosure.

DETAILED DESCRIPTION

In order that the objects, technical solutions and advantages of the present disclosure are clearer, the technical solutions of the present disclosure are described more clearly and completely hereinafter with reference to drawings of embodiments of the present disclosure and in conjunction with implementations. Apparently, the embodiments described herein are some embodiments, not all embodiments, of the present disclosure. All other embodiments obtained by those skilled in the art based on the basic concepts disclosed and indicated in embodiments of the present disclosure are within the scope of the present disclosure.

Figure 1:
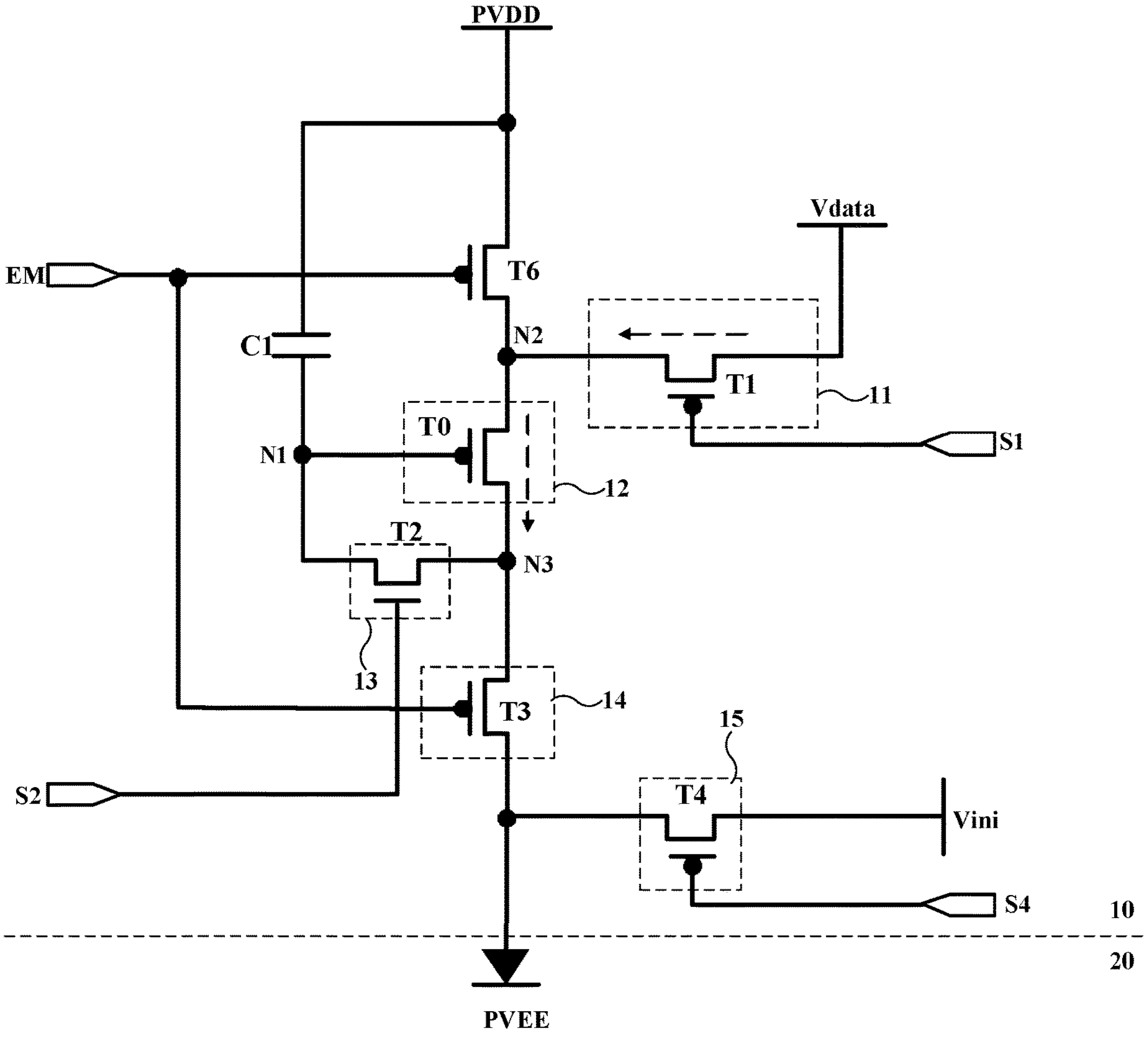
FIG. 1 is a schematic diagram of a pixel circuit of a display panel according to embodiments of the present disclosure.
Figure 2:
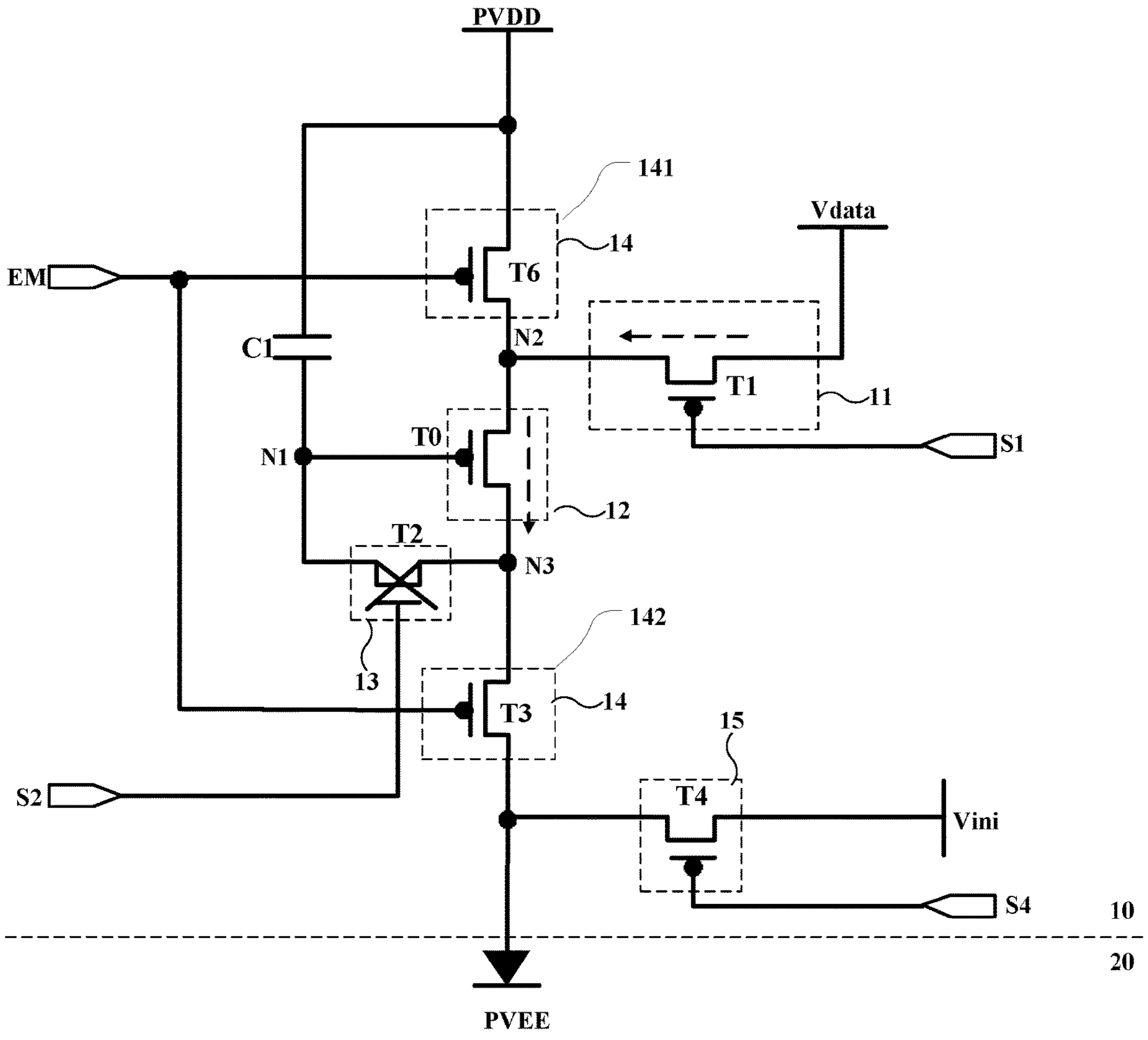
FIG. 2 is one of schematic diagrams of the pixel circuit of FIG. 1 in a bias stage.

As shown in FIG. 1, a schematic diagram of a pixel circuit of a display panel according to embodiments of the present disclosure, the display panel provided in this embodiment includes a pixel circuit 10 and a light-emitting element 20. The pixel circuit 10 includes a data write module 11, a drive module 12 and a compensation module 13. The data write module 11 is configured to selectively provide a data signal for the drive module 12. The drive module 12 is configured to provide a drive current for the light-emitting element 20. The drive module 12 includes a drive transistor T0. The compensation module 13 is configured to compensate for the threshold voltage of the drive transistor T0. The operation of the pixel circuit includes a bias stage. During the bias stage, the data write module 11 and the drive module 12 are on, the compensation module 13 is off, and the data signal is written to the drain of the drive transistor T0 to adjust the bias state of the drive transistor. FIG. 2 is one of schematic diagrams of the pixel circuit of FIG. 1 during the bias stage. In the figures, the direction of an arrow is the direction of the path of a signal.

It is to be noted that FIG. 1 illustrates only the key structures of the preceding embodiment and does not include all the structures operating in the circuit. The complete circuit structure is gradually shown in the following description of this embodiment.

In this embodiment, the pixel circuit 10 includes the data write module 11. The input terminal of the data write module 11 receives the data signal Vdata. The control terminal of the data write module 11 receives a scan signal S1. The output terminal of the data write module 11 is electrically connected to the input terminal of the drive module 12. The scan signal S1 received by the pixel circuit 10 is a pulse signal. The active pulse of the scan signal S1 controls the transmission path of the input terminal and the output terminal of the data write module 11 to turn on so that the data signal is provided for the drive module 12. The inactive pulse of the scan signal S1 controls the transmission path of the input terminal and the output terminal of the data write module 11 to turn off. Thus, under the control of the scan signal S1, the data write module 11 selectively provides the data signal for the drive module 12.

The pixel circuit 10 includes the drive module 12. The output terminal of the drive module 12 is coupled to the light-emitting element 20. The drive module 12 includes the drive transistor T0. After the drive transistor T0 is turned on, the drive module 12 provides the drive current for the light-emitting element 20. The source of the drive transistor T0 is electrically connected to the input terminal of the drive module 12. The drain of the drive transistor T0 is electrically connected to the output terminal of the drive module 12. In this embodiment, the data write module 11 is connected to the source of the drive transistor T0. In other embodiments, the drain of the drive transistor is electrically connected to the input terminal of the drive module, and the source of the drive transistor is electrically connected to the output terminal of the drive module. It is to be understood that the source and the drain of the transistor are not constant, but vary with the drive state of the transistor.

The pixel circuit 10 includes the compensation module 13. The compensation module 13 is configured to compensate for the threshold voltage of the drive transistor T0. The first electrode of the compensation module 13 is electrically connected to the output terminal of the drive module 12. The control terminal of the compensation module 13 receives a scan signal S2. The second electrode of the compensation module 13 is electrically connected to the control terminal of the drive module 12. The scan signal S2 received by the pixel circuit 10 is a pulse signal. The active pulse of the scan signal S2 controls the transmission path of the first electrode and the second electrode of the compensation module 13 to turn on to adjust the voltage between the control terminal of the drive module 12 and the output terminal of the drive module 12 and to compensate for the threshold voltage of the drive transistor T0. The inactive pulse of the scan signal S2 controls the transmission path of the first electrode and the second electrode of the compensation module 13 to turn off. Thus, under the control of the scan signal S2, the compensation module 13 selectively compensates for the threshold voltage of the drive module 12.

In an embodiment, the data write module 11 includes a first transistor T1 whose source is configured to receive the data signal Vdata and whose drain is connected to the source of the drive transistor T0; the compensation module 13 includes a second transistor T2 whose source is connected to the drain of the drive transistor T0 and whose drain is connected to the gate of the drive transistor T0. The gate of the first transistor T1 is configured to receive a scan signal S1. The gate of the second transistor T2 is configured to receive a scan signal S2.

Figure 3:
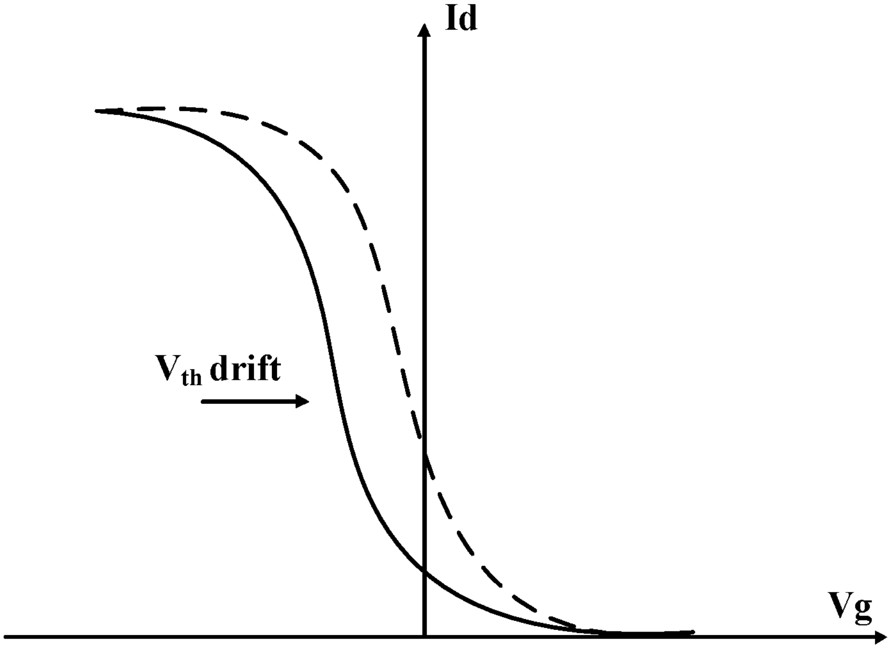
FIG. 3 is a schematic diagram of the drift of the Id-Vg curve of a drive transistor.

In a non-bias stage such as a light emission stage, the gate potential of the drive transistor may be greater than the drain potential of the drive transistor. This setting, if maintained for a long time, may result in the polarization of ions inside the drive transistor and the formation of a built-in electric field inside the drive transistor, causing the threshold voltage of the drive transistor to continuously increase. FIG. 3 shows the Id-Vg curve of a drive transistor. As shown in FIG. 3, the Id-Vg curve drifts, affecting the drive current flowing into the light-emitting element, thereby affecting the display uniformity.

In this embodiment, the bias stage is added to the operation of the pixel circuit 10. During the bias stage, as shown in FIG. 2, the data write module 11 and the drive module 12 are on, and the compensation module 13 is off, so that the data signal Vdata is written to the source of the drive transistor T0 through the turned-on data write module 11 and written to the drain of the drive transistor T0 from the source of the drive transistor T0 to adjust the drain potential of the drive transistor T0 so as to ameliorate the potential difference between the gate potential of the drive transistor T0 and the drain potential of the drive transistor T0. In some cases, the gate potential of the drive transistor T0 may be lower than the drain potential of the drive transistor T0, thereby reducing the degree of ion polarity inside the drive transistor T0, reducing the threshold voltage of the drive transistor T0, and adjusting the threshold voltage of the drive transistor T0 by biasing the drive transistor T0.

In some embodiments, the potential difference between of the drive transistor T0 the gate potential and the drain potential of the drive transistor T0 may be adjusted during the bias stage so that the effect on the internal characteristics of the drive transistor T0 can balance the effect on the internal characteristics of the drive transistor in the non-bias stage in which the gate potential of the drive transistor T0 is greater than the drain potential of the drive transistor, that is, the decrease in the threshold voltage of the drive transistor T0 during the bias stage can balance the increase in the threshold voltage of the drive transistor in the non-bias stage, ensuring that the Id-Vg curve does not drift, thereby ensuring the display uniformity of the display panel.

In embodiments of the present disclosure, the operation of the pixel circuit includes the bias stage. During the bias stage, the data write module and the drive module are on, the compensation module is off, and the data signal is written to the drain of the drive transistor through the turned-on data write module and drive module to adjust the drain potential of the drive transistor so as to ameliorate the potential difference between the gate potential of the drive transistor and the drain potential of the drive transistor. It is known that the pixel circuit includes at least one non-bias stage. When the drive current is generated in the drive transistor, the gate potential of the drive transistor may be greater than the drain potential of the drive transistor, causing the I-V curve of the drive transistor to drift, which in turn, causes the threshold voltage of the drive transistor to drift. During the bias stage, the gate potential and the drain potential of the drive transistor are adjusted so that the drift of the I-V curve of the drive transistor in the non-bias stage can be balanced, the threshold voltage drift of the drive transistor can be reduced, and the display uniformity of the display panel can be ensured.

Figure 4:
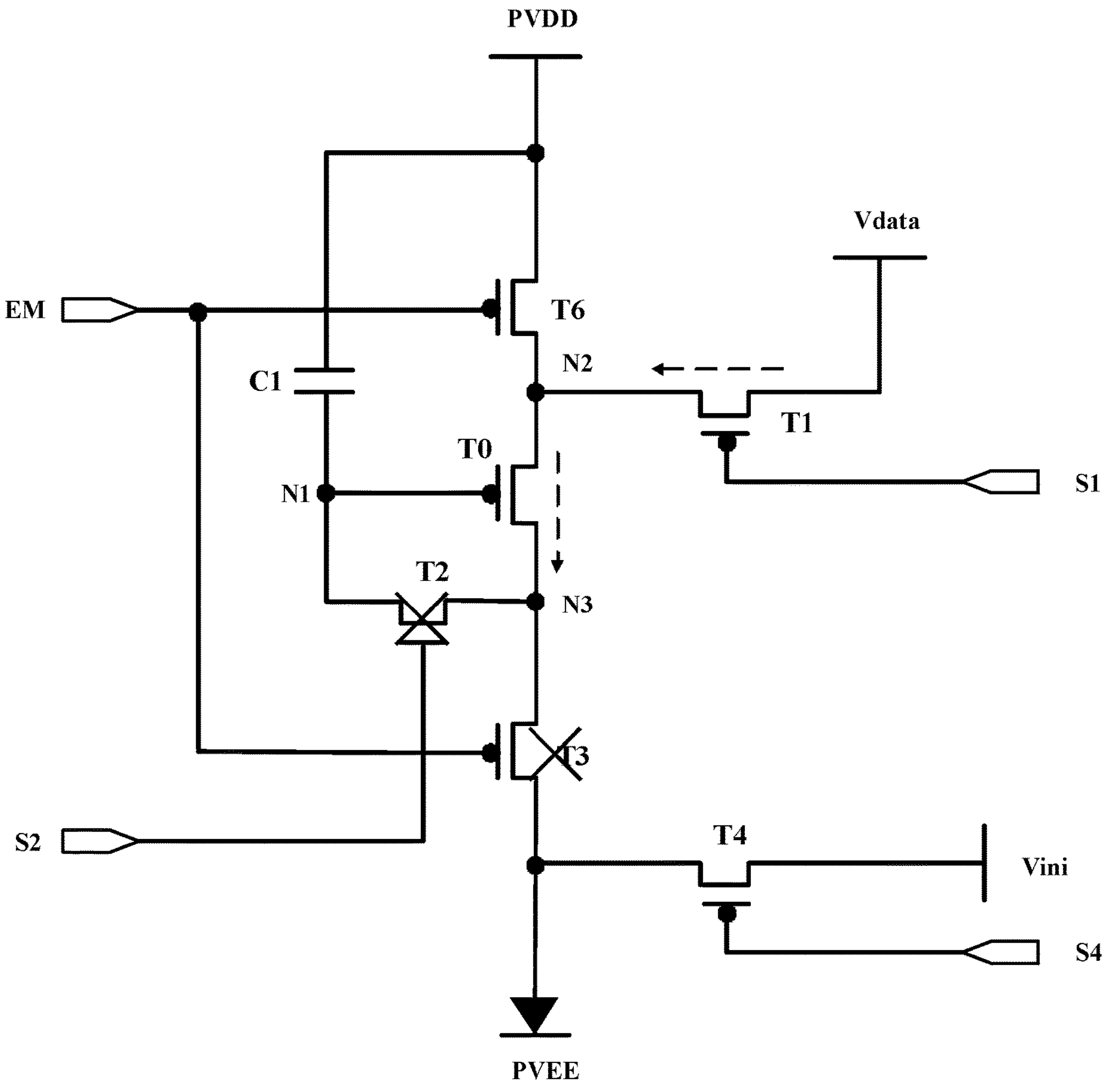
FIG. 4 is one of schematic diagrams of the pixel circuit of FIG. 1 during the bias stage.

Referring to FIGS. 2 and 4, FIG. 4 is one of schematic diagrams of the pixel circuit of FIG. 1 during the bias stage. In an embodiment, the pixel circuit 10 includes a light emission control module 14. The light emission control module 14 is configured to selectively control the light-emitting element to enter a light emission stage. The light emission control module 14 includes a first light emission control module 141 and a second light emission control module 142. The first light emission control module 141 is connected between a first power signal terminal PVDD and the source of the drive transistor T0. The second light emission control module 142 is connected between the drain of the drive transistor T0 and the light-emitting element 20. During the bias stage, at least the second light emission control module 142 is off.

In an embodiment, the light emission control module 14 includes a third transistor T3. The third transistor T3 is connected between the drive transistor T0 and the light-emitting element 20. As shown in FIG. 4, during the bias stage, at least the third transistor T3 is off.

In this embodiment, the gate of the third transistor T3 receives a light emission control signal EM. Under the control of the light emission control signal EM, the third transistor T3 is turned on or off. The operation of the pixel circuit 10 includes the light emission stage. During the light emission stage, the light emission control signal EM outputs an active pulse so that the third transistor T3 is on, and the drive current provided by the drive transistor T0 flows into the light-emitting element 20 to cause the light-emitting element 20 to emit light. In the non-light emission stage, the light emission control signal EM outputs an inactive pulse so that the third transistor T3 is off, and the light-emitting element 20 does not emit light. The non-light emission stage of the pixel circuit 10 includes the bias stage. During the bias stage, the compensation module 13 and the third transistor T3 are off, and the data signal is written to the drain of the drive transistor T0 to adjust the drain potential of the drive transistor T0, to change the potential difference between the drain potential of the drive transistor T0 and the gate potential of the drive transistor T0, and to bias the drive transistor T0.

In an embodiment, the pixel circuit 10 further includes an initialization module 15. The initialization module 15 is configured to selectively provide an initialization signal Vini for the light-emitting element 20. In some embodiments, during the bias stage, the initialization module 15 is not on. In some other embodiments, in at least part of the time period of the bias stage, the initialization module 15 is on.

In this embodiment, the input terminal of the initialization module 15 receives the initialization signal Vini, the output terminal of the initialization module 15 is electrically connected to the light-emitting element 20, and the control terminal of the initialization module 15 receives a scan signal S4. In an initialization stage, the scan signal S4 provides an active pulse for the pixel circuit 10 so that the initialization module 15 is on, the initialization signal Vini is written to the light-emitting element 20 of the pixel circuit 10, and the initialization signal Vini is initialized. The initialization signal Vini is generally a negative voltage signal, so the anode of the light-emitting element 20 has a negative initial voltage in the initialization stage. In at least part of the time period of the bias stage, the initialization module 15 is on, and the anode of the light-emitting element 20 has an initial voltage.

During the bias stage, the initialization module 15 is on so that the light-emitting element 20 receives the initialization signal. During the bias stage, the data signal is written to the drain of the drive transistor T0, and the transistor may have a certain leakage current although T3 is off. Therefore, if the light-emitting element 20 does not receive the initialization signal, the light-emitting element 20 may run the risk of emitting light covertly. Nevertheless, the light-emitting element 20 is initialized during the bias stage so that it is further ensured that the light-emitting element does not emit light.

Figure 5:
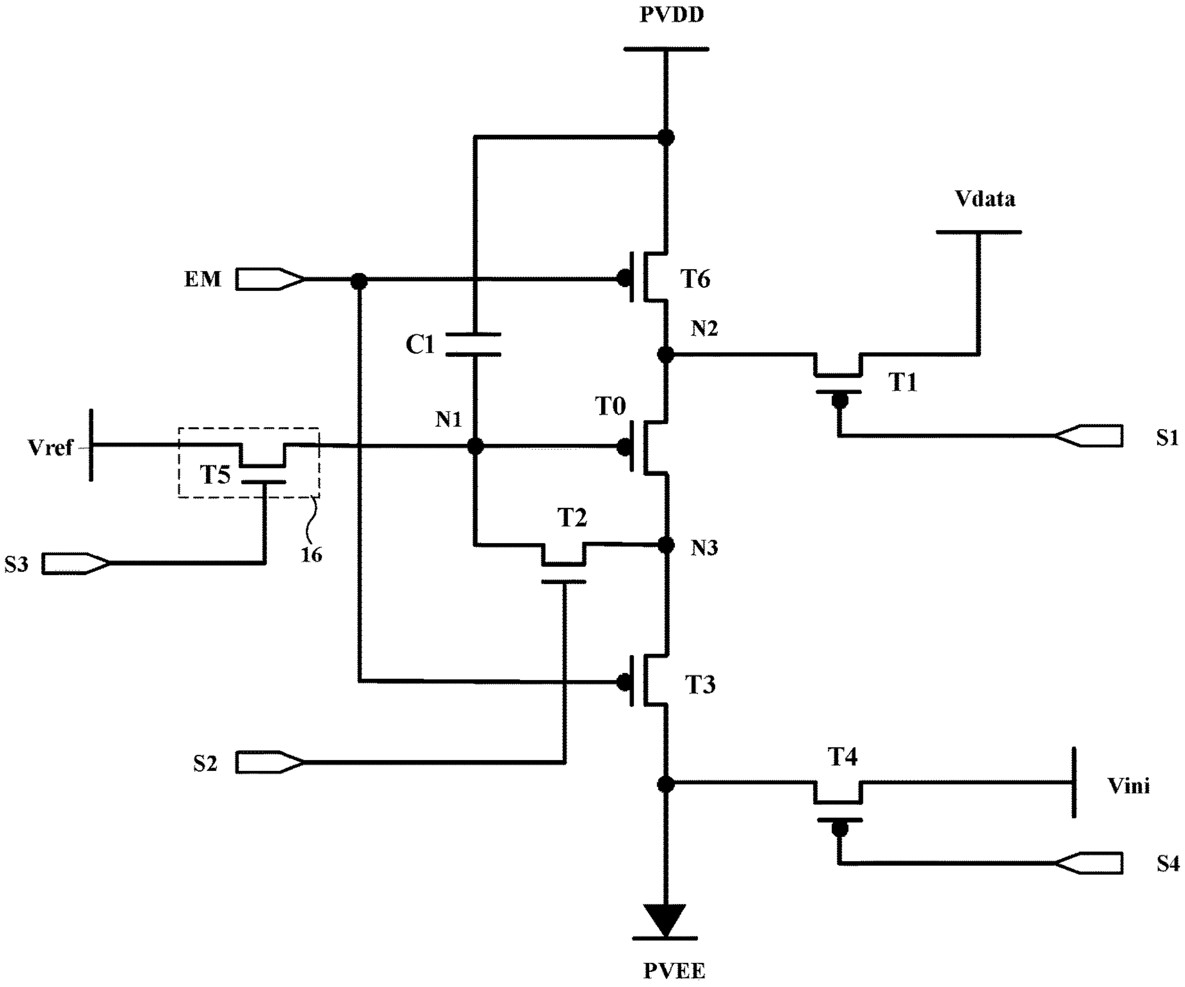
FIG. 5 is a schematic diagram of a pixel circuit of another display panel according to embodiments of the present disclosure.

FIG. 5 is a schematic diagram of a pixel circuit of another display panel according to embodiments of the present disclosure. The pixel circuit 10 further includes a reset module 16. The reset module 16 is configured to selectively provide a reset signal for the gate of a drive transistor T0. In an embodiment, the input terminal of the reset module 16 receives the reset signal Vref, the output terminal of the reset module 16 is electrically connected to the gate of the drive transistor T0, and the control terminal of the reset module 16 receives a scan signal S3. In a reset stage, the scan signal S3 provides an active pulse for the pixel circuit 10 so that the reset module 16 is on, the reset signal Vref is written to the gate of the drive transistor T0, and a reset is performed. For a PMOS-type drive transistor, the reset signal Vref is generally a negative voltage signal, such as −7 V, so the gate of the drive transistor T0 has a negative voltage during the reset stage to facilitate subsequent bias adjustment and data writing.

Figure 6:
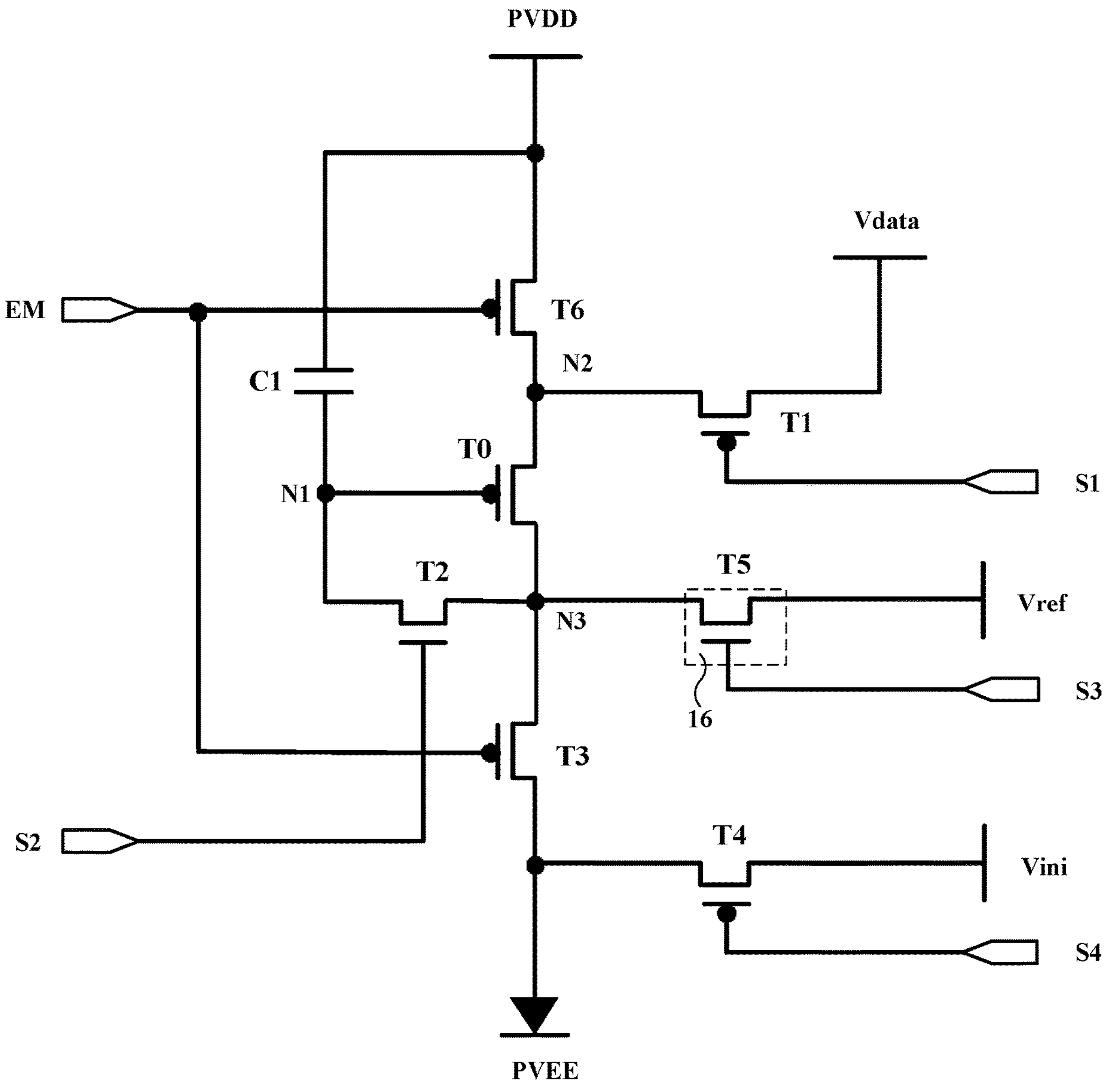
FIG. 6 is a schematic diagram of a pixel circuit of another display panel according to embodiments of the present disclosure.

FIG. 6 is a schematic diagram of a pixel circuit of another display panel according to embodiments of the present disclosure. In an embodiment, the input terminal of a reset module 16 receives a reset signal Vref, the output terminal of the reset module 16 is electrically connected to the gate of a drive transistor T0, and the control terminal of the reset module 16 receives a scan signal S3. In a reset stage, both a scan signal S2 and the scan signal S3 provide an active pulse for the pixel circuit 10 so that the reset module 16 is on, the reset signal Vref is written to the gate of the drive transistor T0, and a reset is performed. For a PMOS-type drive transistor, the reset signal Vref is generally a negative voltage signal, such as −7 V, so the gate of the drive transistor T0 has a negative voltage during the reset stage to facilitate subsequent bias adjustment and data writing.

In the pixel circuit 10 of this embodiment, an initialization module 15 includes a fourth transistor T4 whose source is configured to receive an initialization signal Vini, whose drain is connected to the anode of a light-emitting element 20 and whose gate is configured to receive a scan signal S4.

The reset module 16 includes a fifth transistor T5. As shown in FIG. 5, the source of the fifth transistor T5 receives the reset signal Vref, the drain of the fifth transistor T5 is electrically connected to the gate of the drive transistor T0, and the gate of the fifth transistor T5 receives the scan signal S3. Alternatively, as shown in FIG. 6, the source of the fifth transistor T5 receives the reset signal Vref, the drain of the fifth transistor T5 is electrically connected to the drain of the drive transistor T0, and the gate of the fifth transistor T5 receives the scan signal S3.

The light emission control module 14 further includes a sixth transistor T6 connected between the drive transistor T0 and a supply voltage terminal PVDD. During the bias stage, the third transistor T3 and the sixth transistor T6 are off. The gate of the sixth transistor T6 receives a light emission control signal EM, the source of the sixth transistor T6 receives a PVDD signal, and the drain of the sixth transistor T6 is connected to the source of the drive transistor T0.

In one embodiment, each of transistors T0, T1, T3, T4 and T6 is a PMOS formed using polysilicon as the active layer, and each of transistors T2 is an NMOS formed using an oxide semiconductor as the active layer. It is understood that the active pulse of the scan signal of the NMOS transistor is a high-level signal, and the active pulse of the scan signal of the PMOS transistor is a low-level signal. It is also understood that the pixel circuits shown in FIGS. 1 to 6 are merely examples, and the pixel circuit of each embodiment of the present disclosure is not limited to these examples. For example, in other embodiments, the fifth transistor may be a PMOS using polysilicon as the active layer. It is to be understood that the structure of the pixel circuit is changed, and the driving timing varies with the structure of the pixel circuit in the case where the driving principle is unchanged. Hereinafter, the operation of the pixel circuit is described using the pixel circuit shown in FIG. 5 as an example.

In this embodiment, the width-to-length ratio of the channel region of the NMOS transistor is greater than the width-to-length ratio of the channel region of the PMOS transistor. In the present application, the NMOS transistor mainly functions as a switching transistor and requires a rapid response capability. A transistor having a larger width-to-length ratio has a channel region of a shorter length and thus has a better response capability.

Additionally, in the present application, the four scan signals S1, S2, S3 and S4 may be different signals. In some particular cases, if the timing satisfies certain conditions, at least two of the four signals S1, S2, S3 and S4 may be the same signal. For example, when T4 and T5 are transistors of the same type, such as PMOS or NMOS, S3 and S4 may be the same signal. The particular situation depends on the specific circuit structure and timing and is not limited in this embodiment.

Based on any one of the preceding exemplary embodiments, the display panel includes k rows of light-emitting elements. During the operation of a pixel circuit corresponding to the ith row of light-emitting elements, during the bias stage, the data write module is on, and the data signal written to the drain of the drive transistor is a current data signal on a data signal line to which the pixel circuit is connected; and the current data signal is a data signal written by a pixel circuit corresponding to the jth row of light-emitting elements in a data write stage.

$$k \geq 1, 1 \leq i \leq k, \text{ and } 1 \leq j \leq k.$$

The values of i and j depend on a data writing process of the display panel. In one case, data signals are written line by line in the display panel. In this case, j=i−1, or j=i+1. In another case, the same data write stage of the display panel relates to multiple rows of light-emitting elements 20. For example, from the a-th row of light-emitting elements to the b-th row of light-emitting elements, the data signal is written in the same data write stage. 1≤a≤k, and 1≤b≤k. In this case, the values of j and i may depend on the particular situation, i may be equal to j or may be not equal to j, and this is not limited in this embodiment. It is to be noted that here the data signal written in the data write stage refers to a data signal written to the gate of the drive transistor T0 in the data write stage.

Optionally, in this embodiment, during the bias stage, the drain voltage of the drive transistor T0 is greater than the gate voltage of the drive transistor T0. In the non-bias stage such as the light emission stage, the drain voltage of the drive transistor T0 may be less than the gate voltage of the drive transistor T0, causing the threshold voltage of the drive transistor T0 to drift. Nevertheless, the threshold voltage drift in the non-bias stage can be balanced if the drain voltage of the drive transistor T0 is set greater than the gate voltage of the drive transistor T0 during the bias stage.

The operation of the pixel circuit further includes at least a non-bias stage; during the bias stage, the drive transistor has a gate voltage of Vg1, a source voltage of Vs1 and a drain voltage of Vd1; and in the non-bias stage, the drive transistor has a gate voltage of Vg2, a source voltage of Vs2 and a drain voltage of Vd2.

$$|Vg1-Vd1|<|Vg2-Vd2|.$$

In this case, a reduction in the potential difference between the gate potential of the drive transistor T0 and the drain potential of the drive transistor T0 can alleviate the threshold voltage drift caused by the potential difference between the gate potential of the drive transistor T0 and the drain potential of the drive transistor T0 in the non-bias stage.

Additionally, in some implementations of this embodiment, (Vg1−Vs1)×(Vg2−Vs2)<0, or (Vg1−Vd1)×(Vg2−Vd2)<0.

During the operation of the pixel circuit, if the data signal is written to the drain of the drive transistor through the source of the drive transistor, then the gate voltage and the drain voltage of the drive transistor satisfy (Vg1−Vd1)×(Vg2−Vd2)<0. In the non-bias stage, the gate voltage of the drive transistor in the pixel circuit is greater than the drain voltage of the drive transistor, that is, Vg2>Vd2, then Vg2−Vd2>0. During the bias stage, the data signal is written to the drain of the drive transistor so that the gate voltage of the drive transistor is less than the drain voltage of the drive transistor, that is, Vg1<Vd1, then Vg1−Vd1<0, and (Vg1−Vd1)×(Vg2−Vd2)<0.

In other embodiments, during the operation of the pixel circuit, if the data signal is written to the source of the drive transistor through the drain of the drive transistor, the gate voltage and the source voltage of the drive transistor satisfy (Vg1−Vs1)×(Vg2−Vs2)<0. In the non-bias stage, the gate voltage of the drive transistor in the pixel circuit is greater than the source voltage of the drive transistor, that is, Vg2>Vs2, then Vg2−Vs2>0. During the bias stage, the data signal is written to the source of the drive transistor so that the gate voltage of the drive transistor is less than the source voltage of the drive transistor, that is, Vg1<Vs1, then Vg1−Vs1<0, and (Vg1−Vs1)×(Vg2−Vs2)<0.

In this embodiment, the duration of the non-bias stage such as the light emission stage of the display panel is relatively long; therefore, in order that the threshold voltage drift in the non-bias stage is sufficiently balanced during the bias stage and in order that the bias stage is prevented from consuming too much time, the following setting may be performed: Vd1−Vg1>Vg2−Vd2>0. In this manner, Vd1−Vg1 during the bias stage is sufficiently large so that the desired bias effect can be achieved during the bias stage as soon as possible. In other embodiments, if the source and the drain of the drive transistor are switched, the following setting may be performed: Vs1−Vg1>Vg2−Vs2>0, depending on the particular situation of the circuit.

In some embodiment, the bias stage has a duration of t1, and the non-bias stage has a duration of t2.

$$(|Vg1-Vs1|-|Vg2-Vs2|)\times(t1-t2)<0, \text{ or } (|Vg1-Vd1|-|Vg2-Vd2|)\times(t1-t2)<0$$

In this embodiment, during the bias stage, the data signal is written to the drain of the drive transistor through the source of the drive transistor so that the drain voltage of the drive transistor is greater than the gate voltage of the drive transistor, that is, Vg1−Vd1<0; in the non-bias stage, the gate voltage of the drive transistor is greater than the drain voltage of the drive transistor, that is, Vg2−Vd2>0. In the process of biasing the drive transistor, if the bias voltage is relatively large, the bias duration may be appropriately reduced; if the bias voltage is relatively small, the bias duration may be appropriately prolonged.

Based on this, if |Vg1−Vd1|−|Vg2−Vd2|>0, then the bias voltage is relatively large. In this case, the duration of the bias stage may be appropriately reduced that is, t1<t2, so that the difference between the threshold voltage during the bias stage and the threshold voltage in the non-bias stage is reduced. If |Vg1−Vd1|−|Vg2−Vd2|<0, then the bias voltage is relatively small. In this case, the duration of the bias stage may be appropriately prolonged, that is, t1>t2, so that the difference between the threshold voltage during the bias stage and the threshold voltage in the non-bias stage is reduced.

In other embodiments, during the bias stage, the data signal is written to the source of the drive transistor through the drain of the drive transistor, and the gate and the drain of the drive transistor during the bias stage and the non-bias stage satisfy (|Vg1−Vs1|−|Vg2−Vs2|)×(t1−t2)<0, thereby reducing the threshold voltage drift in the non-bias stage.

It is to be noted that a contrast between the bias stage and the non-bias stage in the preceding embodiments, especially a contrast related to durations, generally refers to a contrast between a continuous bias stage and a continuous non-bias stage.

In this embodiment, the duration of the bias stage is greater than 5 microseconds and, in particular, may be greater than 20 microseconds. The inventors of the present application have verified that when the duration of the bias stage is greater than 5 microseconds, especially greater than 20 microseconds, the threshold voltage drift can be effectively alleviated; when the duration of the bias stage is less than 5 microseconds, the duration of the bias stage is so short that the bias state of the drive transistor T0 is not adjusted sufficiently, so the threshold voltage drift cannot be effectively alleviated.

The non-bias stage is the light emission stage of the display panel. Exemplarily, in one light emission stage, the drive transistor T0 has a source voltage of 4.6 V, a gate voltage of 3 V and a drain voltage of 1 V. The gate voltage of the drive transistor is greater than the drain voltage of the drive transistor. The drive transistor is biased during the bias stage so that the threshold voltage drift of the drive transistor during the light emission stage can be compensated.

Figure 7:
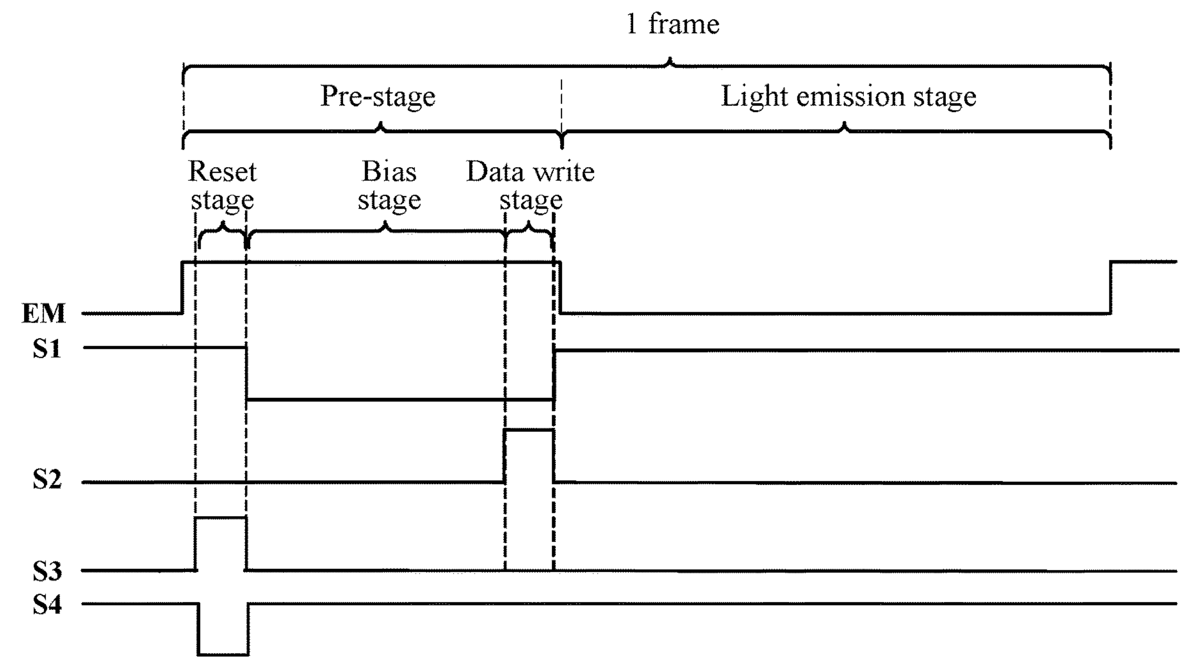
FIG. 7 is a first operation timing diagram of a pixel circuit.

FIG. 7 is an exemplary timing diagram of a pixel circuit. It is to be noted that terms such as "first" used here and hereinafter are intended only to distinguish between different diagrams and not to indicate the sequence of these diagrams. As shown in FIG. 7, for the duration of one frame of the display panel, the operation of the pixel circuit includes a pre-stage and a light emission stage; and in the duration of one frame of at least one frame, the pre-stage of the pixel circuit includes the bias stage.

In this embodiment, for the duration of one frame of the display panel, the operation of the pixel circuit includes the pre-stage and the light emission stage. In some cases, the pre-stage and the light emission stage may be performed sequentially. In the duration of one frame of at least one frame, the pre-stage of the pixel circuit includes the bias stage. During the bias stage, the data signal is written to the drain of the drive transistor through the source of the drive transistor, and the potential difference between the gate potential of the drive transistor and the drain potential of the drive transistor is adjusted. In some cases, the drain voltage of the drive transistor may be set greater than the gate voltage of the drive transistor so that the drive transistor is biased. In the non-bias stage, the gate voltage of the drive transistor is greater than the drain voltage of the drive transistor, resulting in an increase in the threshold voltage of the drive transistor. Thus, the non-bias stage is added to the pixel circuit in the duration of one frame of at least one frame to at least partially balance the increase in the threshold voltage of the drive transistor in the non-bias stage, thereby improving the display uniformity of the display panel.

As shown in FIG. 7, for the duration of one frame of the display panel, the operation of the pixel circuit includes the pre-stage and the light emission stage; and in the duration of one frame of at least one frame, the pre-stage of the pixel circuit includes the bias stage. The pre-stage includes a reset stage and the bias stage; and during the reset stage, the gate of the drive transistor receives a reset signal and is reset.

With reference to the pixel circuit 10 shown in FIGS. 5 and 6, the fifth transistor T5 and the second transistor T2 are NMOS transistors, and other transistors are PMOS transistors. As shown in FIG. 5, during the reset stage, when the scan signal S3 outputs a high-level active pulse, the fifth transistor T5 is on, and the reset signal Vref is written to the gate of the drive transistor T0 so that the gate of the drive transistor T0 is reset to a negative potential of less than V. In other embodiments, in the pixel circuit 10 shown in FIG. 6, during the reset stage, the scan signal S3 outputs a high-level active pulse, and the scan signal S2 outputs a high-level active pulse, both the fifth transistor T5 and the second transistor T2 are on, and the reset signal Vref is written to the gate of the drive transistor T0 so that the gate of the drive transistor T0 is reset to a negative potential of less than 0 V.

During the bias stage, the scan signal S1 outputs a low-level active pulse, and the first transistor T1 is on. In this embodiment, the second transistor is an oxide semiconductor and is an NMOS transistor, the scan signal S2 outputs a low-level active pulse, the second transistor T2 is off, the drive transistor T0 is on, the data signal is written to the drain of the drive transistor T0, and the drain potential of the drive transistor T0 is adjusted.

The bias stage has a duration of t1, and the reset stage has a duration of t3. t1>t3.

During the reset stage, only the reset signal is written to the gate of the drive transistor so that the gate of the drive transistor is reset to a negative potential of less than 0 V; therefore, the duration t3 of the reset stage can be relatively small. During the bias stage, the data signal is written to the drain of the drive transistor so that the potential difference between the gate potential of the drive transistor and the drain potential of the drive transistor can be adjusted so that the drive transistor can be biased, and the threshold voltage drift of the drive transistor during the light emission stage can be reduced. Because the duration of the non-bias stage such as the light emission stage is relatively long, the duration t1 of the bias stage is relatively long so that the threshold voltage drift in the non-bias stage is sufficiently reduced. Based on this, the following setting is performed: t1>t3.

In an embodiment, as shown in FIG. 7, at the end of the reset stage, the gate of the drive transistor is disconnected from the reset signal; meanwhile, the data write module is turned on, and the pixel circuit enters the bias stage. In this embodiment, at the end of the reset stage, the data write module is turned on, and the pixel circuit enters the bias stage, ensuring that the pre-stage of the pixel circuit is shortened as much as possible, thereby reducing the duration of one frame and facilitating high-frequency displaying.

Figure 8:
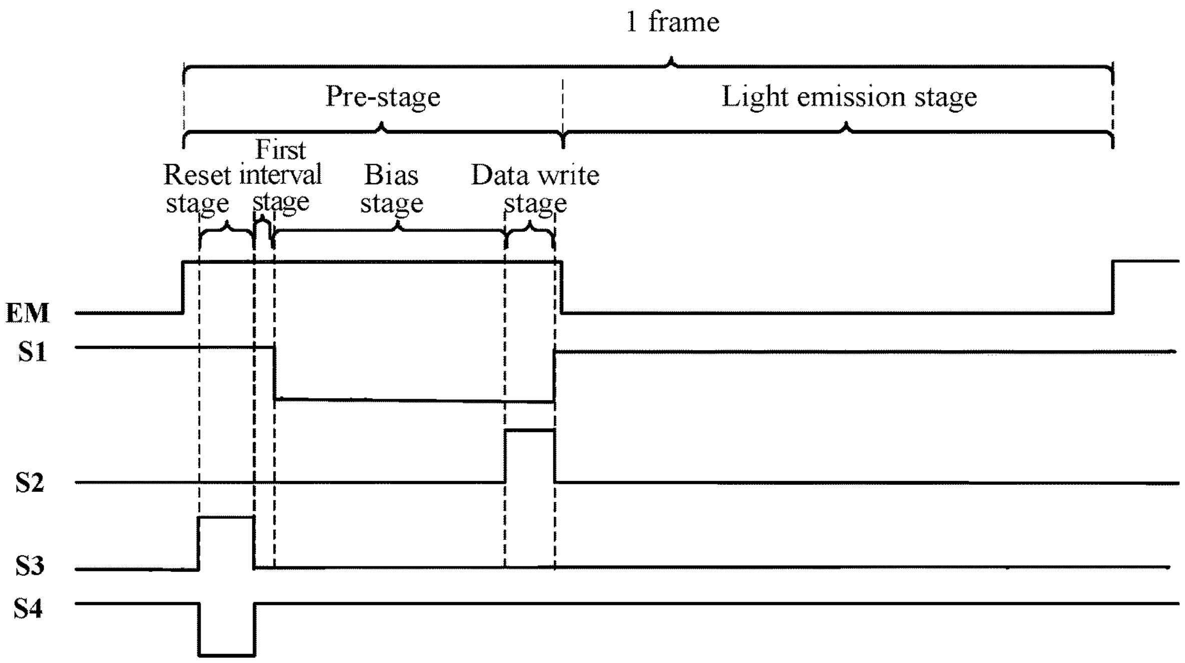
FIG. 8 is a second operation timing diagram of a pixel circuit.

As shown in FIG. 8, a second operation timing diagram of a pixel circuit, between the end of the reset stage and the start of the bias stage, the pre-stage further includes a first interval stage in which the gate of the drive transistor is disconnected from the reset signal, and the data write module is off. In this embodiment, in the first interval stage, the scan signal S3 hops from a high level to a low level, the fifth transistor T5 is off, the gate of the drive transistor is disconnected from the reset signal, and the data write module is off, so the drive transistor can have a stable period. At the end of the first interval stage, the data write module is turned on, and the pixel circuit enters the bias stage. In this manner, after the reset stage, the drive transistor is stabilized in the first interval stage and then enters the bias stage, thereby improving the stability of the pixel circuit.

The bias stage has a duration of t1, the reset stage has a duration of t3, and the first interval stage has a duration of t4, where t1>t4, or t3>t4. It is to be understood that the reset stage is used only for reset of the gate voltage of the drive transistor, and the first interval stage is used for stabilization of the drive transistor, so the duration t3 of the reset stage and the duration t4 of the first interval stage can be as short as a reaction duration; therefore, the following setting is performed: t1>t4, or t3>t4. In one embodiment, t4≤t1/2, so the duration t4 of the first interval stage can be short enough to ensure the duration of the pre-stage not to be too long.

Figure 9:
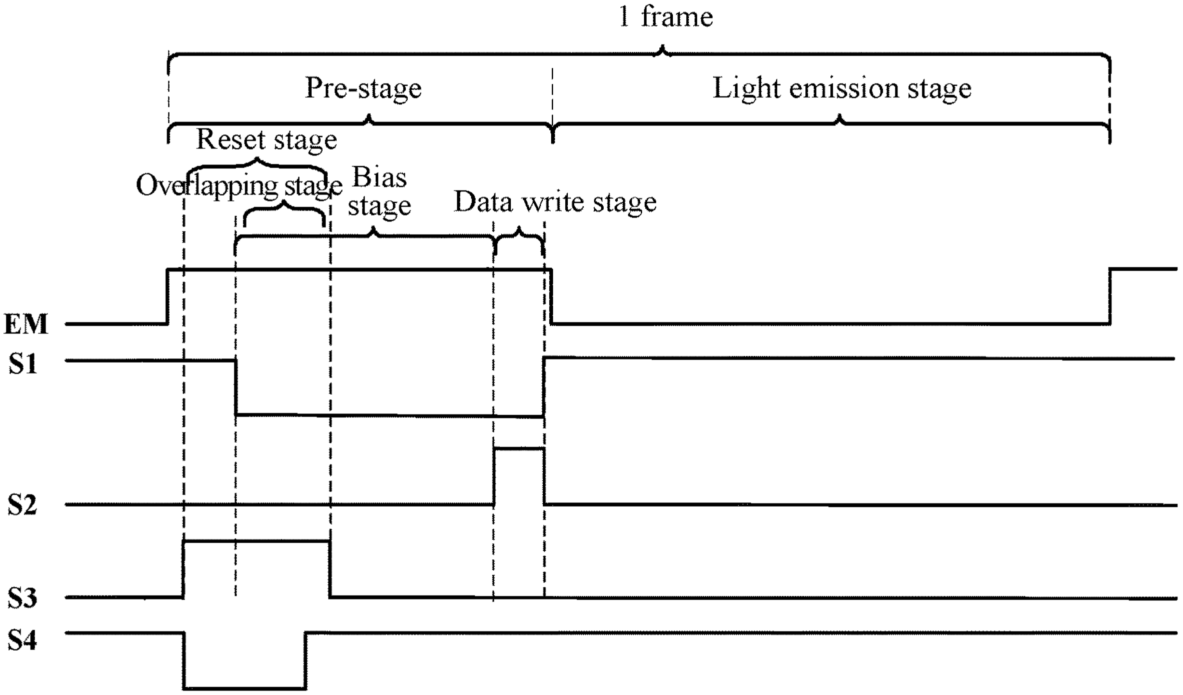
FIG. 9 is a third operation timing diagram of a pixel circuit.

As shown in FIG. 9, a third operation timing diagram of a pixel circuit, the time period of the reset stage at least partially overlaps the time period of the bias stage.

In the pixel circuit shown in FIG. 5, the reset module 16 is connected to the gate of the drive transistor, and the data signal is written to the drain of the drive transistor during the bias stage, so the operation during the reset stage and the operation during the bias stage do not affect each other in the case where the second transistor T2 is off. Based on this, the time period of the reset stage at least partially overlaps the time period of the bias stage. During the bias stage, the reset stage is performed. In this manner, the drain potential of the drive transistor T0 is adjusted through the data signal while the gate potential of the drive transistor T0 is adjusted through the reset signal so that the bias effect is improved.

During the reset stage, the second transistor T2 is off, the fifth transistor T5 is on, and the reset signal Vref is written to the gate of the drive transistor T0. During the overlapping stage in which the bias stage overlaps the reset signal, the second transistor T2 is off, the first transistor T1 is on, and the data signal Vdata is written to the drain of the drive transistor T0; meanwhile, the fifth transistor T5 is on, and the reset signal Vref is continuously written to the gate of the drive transistor T0 so that the gate voltage of the drive transistor T0 can be stabilized. During the non-overlapping stage in which the bias stage does not overlap the reset signal, the fifth transistor T5 is off, the first transistor T1 is on, and the data signal Vdata is written to the drain of the drive transistor T0.

During the bias stage, if the gate of the drive transistor T0 receives a low-level reset signal, and the data signal Vdata is written to the drain of the drive transistor T0, then both the gate potential and the drain potential can be adjusted so that the threshold voltage drift caused by the setting in which the gate potential is greater than the drain potential in the non-bias stage can be better alleviated.

As shown in FIG. 9, the gate of the drive transistor is disconnected from the reset signal before the bias stage ends, and then the bias stage ends. In this embodiment, the time period of the bias stage partially overlaps the reset stage, the reset signal is continuously written to the gate of the drive transistor, and the gate of the drive transistor stably retains the reset signal, thereby improving the bias effect. Before the bias stage ends, the fifth transistor T5 is turned off so that the gate of the drive transistor is disconnected from the reset signal, and then the bias stage ends. In this manner, after the reset stage ends, the drain of the drive transistor T0 also receives the data signal, thereby ensuring the bias effect of the drive transistor T0.

As shown in FIG. 9, during the bias stage, the initialization module is also on so that during the bias stage, the initialization module continuously provides the initialization signal to the light-emitting element 20 to ensure that the light-emitting element is in the non-light emission state.

Figure 10:
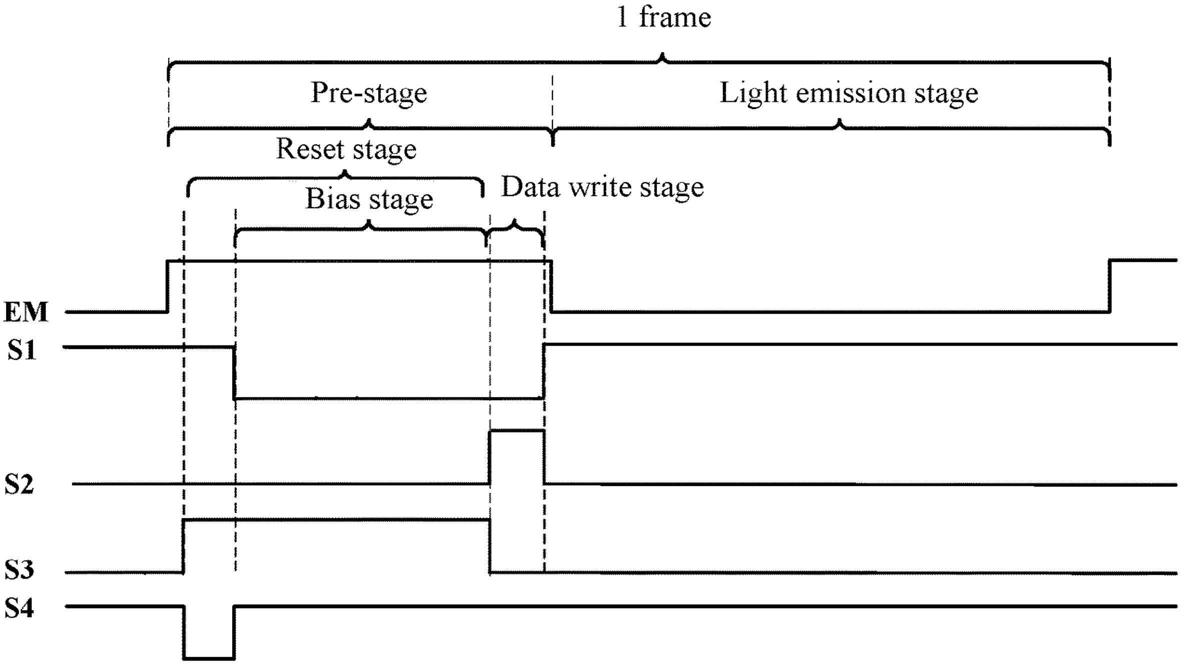
FIG. 10 is a fourth operation timing diagram of a pixel circuit.

As shown in FIG. 10, a fourth operation timing diagram of a pixel circuit, during the bias stage, the gate of the drive transistor remains receiving the reset signal. In the pixel circuit shown in FIG. 5, during the bias stage, the second transistor T2 is off, the first transistor T1 is on, the fifth transistor T5 is on, and the data signal Vdata is written to the drain of the drive transistor T0; meanwhile, the reset signal Vref is continuously written to the gate of the drive transistor T0 so that the gate voltage of the drive transistor T0 can be stabilized during the bias stage. Additionally, the reset stage overlaps the bias stage so that the duration of the pre-stage of the pixel circuit can be shortened, thereby facilitating high-frequency displaying. Moreover, during the bias stage, the reset stage is performed. In this manner, the drain potential of the drive transistor T0 is adjusted through the data signal while the gate potential of the drive transistor T0 is adjusted through the reset signal so that the bias effect is improved.

As shown in FIG. 10, at the time when the bias stage ends, the gate of the drive transistor is disconnected from the reset signal. In this embodiment, the entire time period of the bias stage overlaps the reset stage, the start of the reset stage is earlier than or the same as the start of the bias stage, and the end of the reset stage is later than or the same as the end of the bias stage. For example, in some embodiments, after the bias stage ends, the gate of the drive transistor T0 is disconnected from the reset signal. As described above, the reset signal is continuously written to the gate of the drive transistor during the reset stage and the bias stage so that the gate voltage of the drive transistor is stable before the data write stage, and the bias effect is improved.

Figure 11:
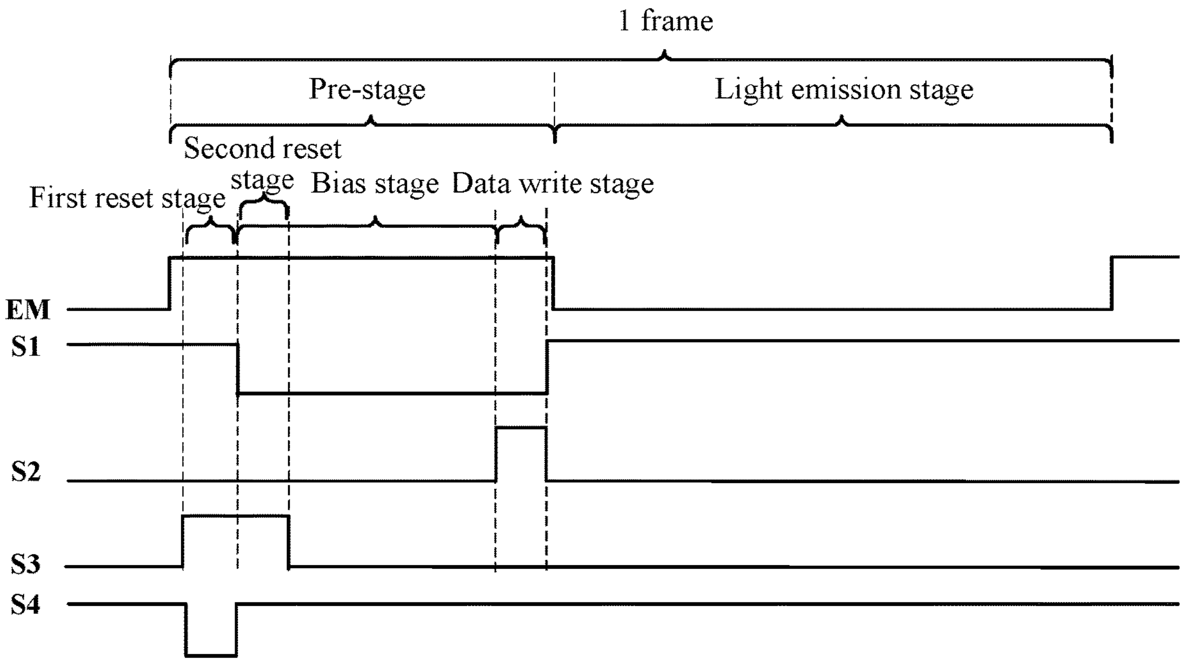
FIG. 11 is a fifth operation timing diagram of a pixel circuit.

As shown in FIG. 11, a fifth operation timing diagram of a pixel circuit, the reset stage includes a first reset stage and a second reset stage; in the first reset stage that does not overlap the bias stage, the gate of the drive transistor receives a first reset signal; in at least part of the time period of the bias stage, the gate of the drive transistor receives a second reset signal, and the bias stage at least partially overlaps the second reset stage. The first reset stage may be used for reset of the gate potential of the drive transistor so that the gate potential is lower than 0 V. The second reset stage may be used for stabilization of the gate potential of the drive transistor during the bias stage so that bias adjustment of the drive transistor is achieved. Part of the time of the bias stage overlaps the time of the second reset stage. In other embodiments, the entire time of the bias stage overlaps the time of the second reset stage.

The first reset signal and the second reset signal have the same potential. In other embodiments, the first reset signal and the second reset signal have different potentials. In some optional embodiments, the first reset signal lowers the gate potential of the drive transistor, so the first reset signal is less than 0V; the second reset signal stabilizes the gate potential of the drive transistor during the bias stage to increase the bias effect. Based on this, the second reset signal may be the same as or different from the first reset signal. Related practitioners may flexibly design the pixel circuit to satisfy different design requirements.

In an embodiment, the absolute value of the potential of the first reset signal is greater than the absolute value of the potential of the second reset signal; and the drive transistor is a PMOS transistor, and the potential of the first reset signal is lower than the potential of the second reset signal; or the drive transistor is an NMOS transistor, and the potential of the first reset signal is higher than the potential of the second reset signal. Optionally, the absolute value of the potential of the first reset signal is greater than the absolute value of the potential of the second reset signal so that on the basis that the second reset signal plays a biasing role during the bias stage, the power consumption of the pixel circuit can be reduced by using the second reset signal having a lower potential absolute value.

In another embodiment, the absolute value of the potential of the first reset signal is less than the absolute value of the potential of the second reset signal; and the drive transistor is a PMOS transistor, and the potential of the second reset signal is lower than the potential of the first reset signal; or the drive transistor is an NMOS transistor, and the potential of the second reset signal is higher than the potential of the first reset signal. The absolute value of the potential of the first reset signal is less than the absolute value of the potential of the second reset signal. In a particular case of the display panel, for example, in the case of high-frequency driving, during the reset stage, the level of the first reset signal is a negative potential whose absolute value is relatively small so that the time of the data write stage can be shortened, thereby facilitating high-frequency driving.

Figure 12:
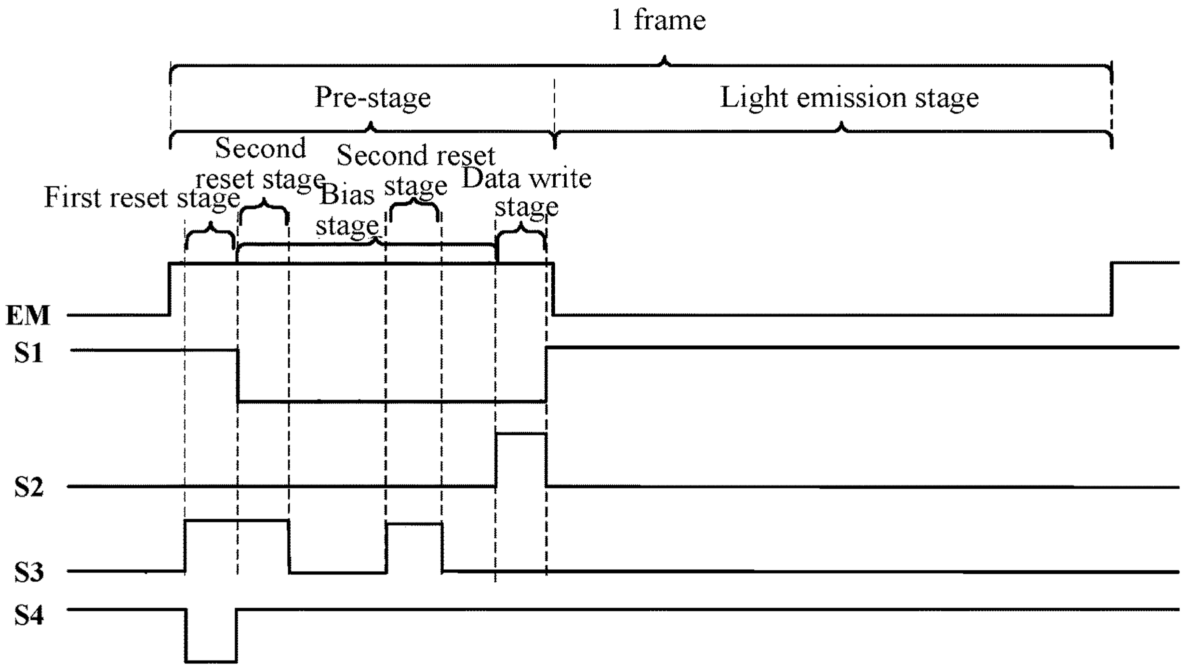
FIG. 12 is a sixth operation timing diagram of a pixel circuit.

As shown in FIG. 12, a schematic diagram of a sixth operation timing of a pixel circuit, during the bias stage, the second reset stage is performed at least two times, and between adjacent second reset stages, the gate of the drive transistor is disconnected from the reset signal. In this embodiment, during the bias stage, multiple second reset stages may be designed, and the gate potential of the drive transistor can be reset in each second reset stage, thereby facilitating bias adjustment of the drive transistor and further improving the bias effect.

As shown in FIG. 7, for the duration of one frame of the display panel, the operation process of the pixel circuit includes a pre-stage and a light emission stage; and for the duration of one frame of at least one frame, the pre-stage of the pixel circuit includes the bias stage. The pre-stage includes a reset stage, the bias stage and a data write stage in sequence; and in the data write stage, the data write module, the drive module and the compensation module are on, and the data signal is written to the gate of the drive transistor.

In this embodiment, in the data write stage, the scan signal S1 outputs an active pulse signal so that the data write module is on, and the drive module is on; the scan signal S2 outputs an active pulse signal so that the compensation module is on. Then, the data signal is written to the control terminal of the drive module, that is, the gate of the drive transistor, through the turned-on data write module, drive module and compensation module.

The bias stage has a duration of t1, and the data write stage has a duration of t5, where $t1>t5$. It is to be understood that the data write stage is used only for writing the data signal to the gate of the drive transistor and thus can be as short as a reaction duration; during the bias stage, the data signal is written to the drain of the drive transistor, the drive transistor is biased, and the threshold voltage drift of the drive transistor during the light emission stage is reduced, and the duration of the light emission stage is relatively long, so the duration t1 of the bias stage is relatively long, so that the threshold voltage drift in the non-bias stage is sufficiently reduced. Based on this, the following setting is performed: $t1>t5$.

As shown in FIG. 7, in the time period from the bias stage to the data write stage, the data write module is on. In this embodiment, in the time period from the bias stage to the data write stage, the scan signal S1 outputs an active pulse signal so that the data write module is on, and the drive transistor is on; during the bias stage, the compensation module is off, and the data signal can be written to the drain of the drive transistor; in the data write stage, the scan signal S2 outputs an active pulse signal so that the compensation module is on, and the data signal can be written to the gate of the drive transistor.

Figure 13:
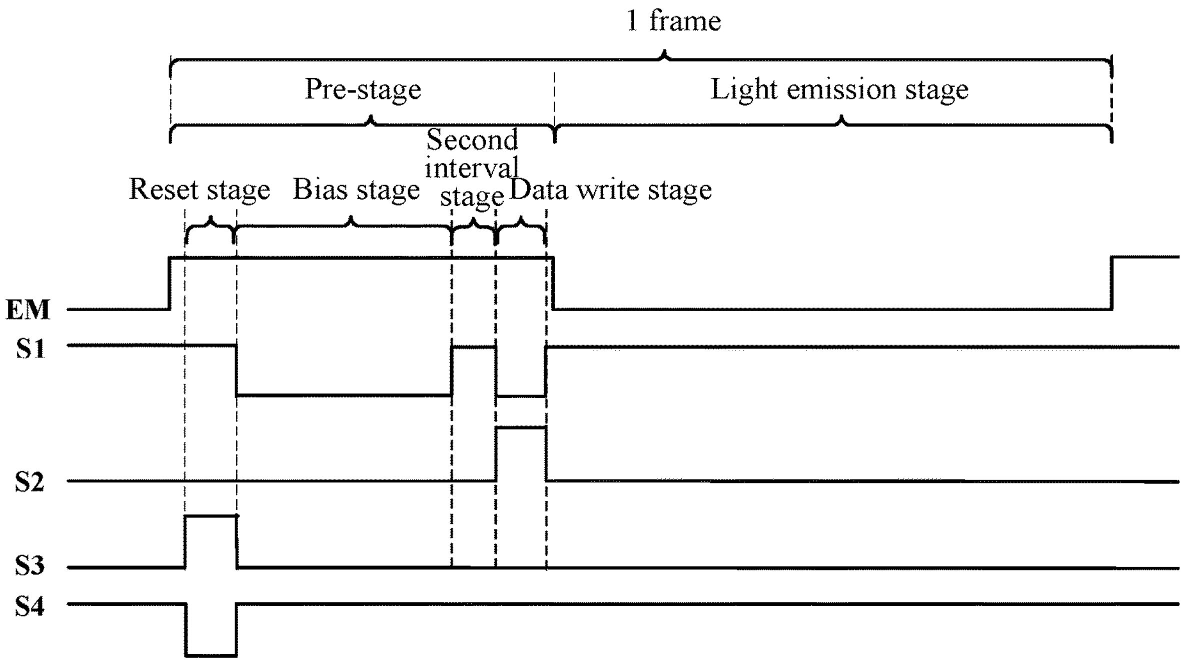
FIG. 13 is a seventh operation timing diagram of a pixel circuit.

As shown in FIG. 13, a seventh operation timing diagram of a pixel circuit, from the end of the bias stage to the start of the data write stage, the pixel circuit includes a second interval stage in which the data write module is off. In this embodiment, in the second interval stage, the scan signal S1 hops from a low level to a high level, the data write module is off, the drain of the drive transistor is disconnected from the data signal, and the drive transistor can have a stable period; at the end of the second interval stage, the scan signal S1 hops from a high level to a low level, the data write module is on, and the pixel circuit enters the data write stage. In this manner, after the bias stage ends, the drive transistor is stabilized in the second interval stage and then enters the data write stage, thereby improving the stability of the pixel circuit.

The bias stage has a duration of t1, the data write stage has a duration of t5, and the second interval stage has a duration of t6, where t1>t6, or t5>t6. It is to be understood that the data write stage is used only for writing the data signal to the gate of the drive transistor, and the second interval stage is a transition stage used for stabilization of the drive transistor, so the duration t5 of the data write stage and the duration t6 of the second interval stage can be as short as a reaction duration; therefore, the following setting is performed: t1>t6, or t5>t6. In one embodiment, t6≤t1/2, so the duration t6 of the second interval stage can be short enough to ensure the duration of the pre-stage not to be too long.

As shown in FIG. 7, the pre-stage includes a reset stage, the bias stage and a data write stage in sequence; during the reset stage, the gate of the drive transistor receives a reset signal and is reset; and in the data write stage, the data write module, the drive module and the compensation module are on, and the data signal is written to the gate of the drive transistor.

In this embodiment, in the pre-stage of the pixel circuit, first the gate of the drive transistor is reset so that the gate voltage of the drive transistor is pulled down to a negative voltage lower than 0 V, thereby facilitating subsequent biasing of the drive transistor; then, the data signal is written to the drain of the drive transistor, the drive transistor is biased, and the threshold voltage drift of the drive transistor in the non-bias stage is reduced; finally, in the data write stage, the data write module, the drive module and the compensation module are all on, and the data signal is written to the gate of the drive transistor.

The bias stage has a duration of t1, the reset stage has a duration of t3, and the data write stage has a duration of t4, where t1>t3, and t1>t4. For the duration of one frame, the threshold voltage of the drive transistor is caused to drift in the non-bias stage, but the duration of the non-bias stage is relatively long, so in order that the threshold voltage drift of the drive transistor in the non-bias stage is reduced, the duration of the bias stage is set to be relatively long; the data write stage is used only for writing the data signal to the gate of the drive transistor, so the duration of the data write stage is set to be relatively short; the reset stage is used only for writing the reset signal to the gate of the drive transistor, so the duration of the reset stage is set to be relatively short. Based on this, the following settings are performed: t1>t3, and t1>t4.

Figure 14:
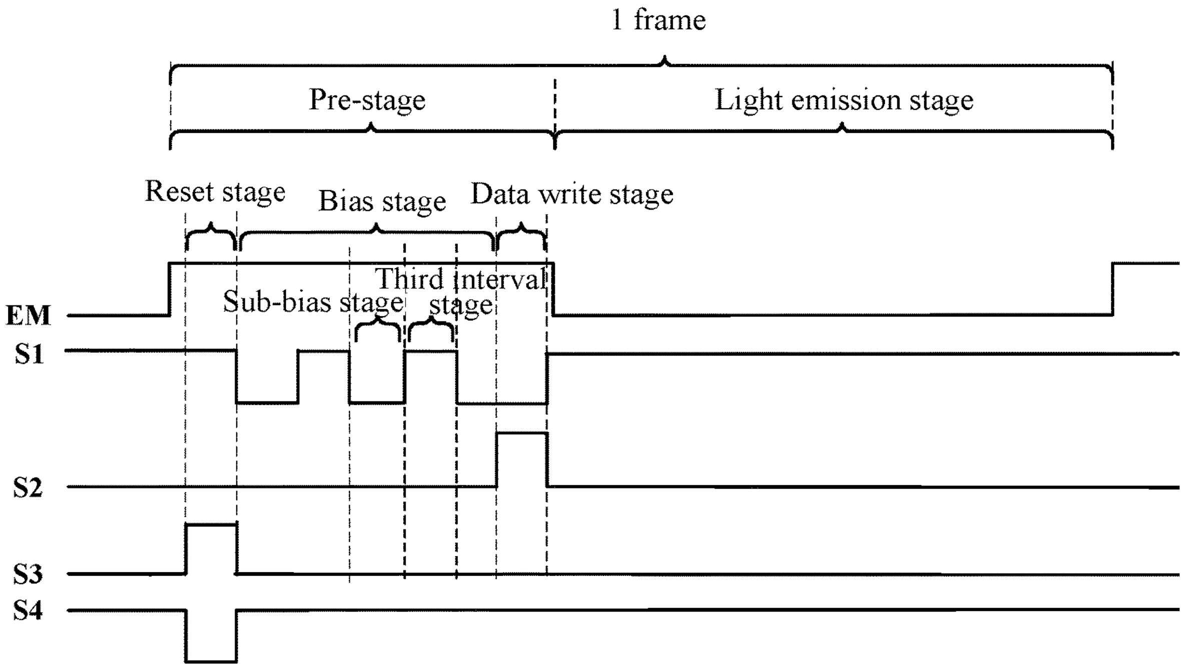
FIG. 14 is an eighth operation timing diagram of a pixel circuit.

Referring to FIG. 14, an eighth operation timing diagram of a pixel circuit, exemplarily, based on any one of the preceding embodiments, he bias stage includes m sub-bias stages in sequence, where m≥1; and among the m sub-bias stages, the interval between two adjacent sub-bias stages is a third interval stage in which the data write module is off.

As shown in FIG. 14, the bias stage includes at least two sub-bias stages in sequence, and in the at least two sub-bias stages, the interval between two adjacent sub-bias stages is a third interval stage in which the data write module is off. In each sub-bias stage, the scan signal S1 outputs an active pulse signal so that the data write module is on, the data signal is written to the drain of the drive transistor through the data write module and the drive module in sequence, and the drive transistor is biased. During the third interval stage, the scan signal S1 outputs an inactive pulse signal, the data write module is off, and the data signal is disconnected from the drain of the drive transistor. The bias stage includes multiple sub-bias stages. In each sub-bias stage, the threshold voltage drift of the drive transistor in the non-bias stage can be reduced. Through the multiple sub-bias stages, the threshold voltage drift of the drive transistor caused in the non-bias stage can be sufficiently reduced, thereby further improving the bias effect.

In other embodiments, as shown in FIG. 7, the bias stage includes one sub-bias stage, that is, bias stage. In this bias stage, the data write module is steady on.

Figure 15:
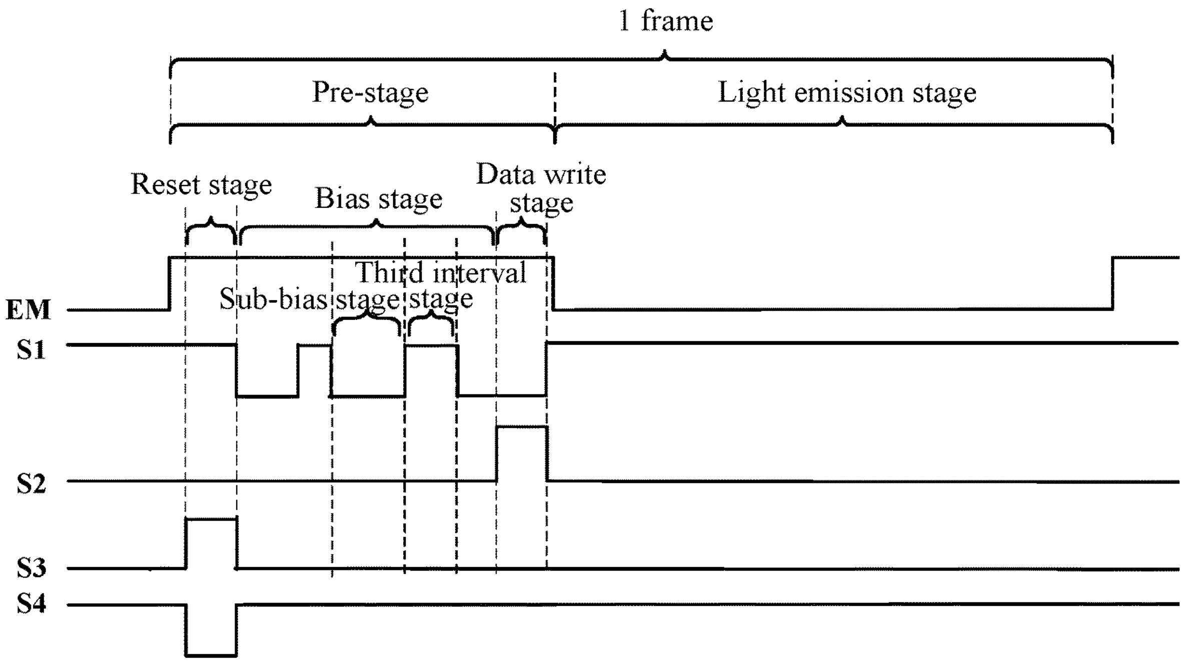
FIG. 15 is a ninth operation timing diagram of a pixel circuit.

As shown in FIG. 15, a ninth operation timing diagram of a pixel circuit, the bias stage includes at least two third interval stages. The at least two third interval stages have different durations. The durations of the third interval stages increase or decrease sequentially with the m sub-bias stages. The duration of at least one third interval stage is shorter than the duration of at least one sub-bias stage. In one embodiment, the duration of at least one third interval stage is shorter than half of the duration of at least one sub-bias stage, to ensure the duration of the pre-stage not to be too long.

One third interval stage is a transition stage between sub-bias stages, so the duration of the third interval stage can be shorter than the duration of one sub-bias stage. In particular, the duration of any third interval stage is shorter than the duration of any sub-bias stage. It is to be understood that the durations of the multiple third interval stages may be the same or different, or the durations of the multiple third interval stages satisfy rules such as progressive increase or progressive decrease. In embodiments of the present disclosure, the design of the bias stage of the pixel circuit is not limited to the preceding situation and is flexible according to the bias requirements of the pixel circuit in different cases.

Figure 16:
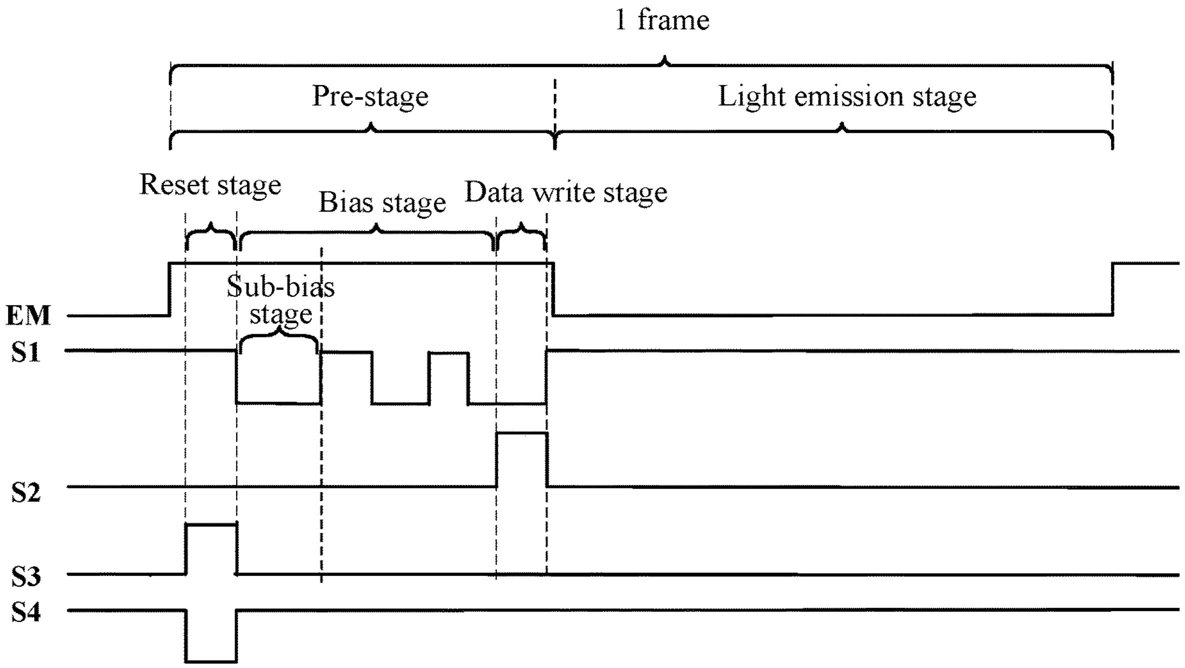
FIG. 16 is a tenth operation timing diagram of a pixel circuit.

As shown in FIG. 16, a tenth operation timing diagram of a pixel circuit, among the m sub-bias stages, at least two sub-bias stages have different durations; the duration of the first sub-bias stage is greater than the duration of each of others of the m sub-bias stages; the durations of the sub-bias stages decrease sequentially with the m sub-bias stages. It is understood that the durations of the multiple third interval stages may be the same or different, or the durations of the multiple third interval stages satisfy rules such as progressive increase or progressive decrease. In embodiments of the present disclosure, the design of the bias stage of the pixel circuit is not limited to the preceding situation and is flexible according to the bias requirements of the pixel circuit in different cases.

In the case where the duration of the first sub-bias stage is greater than the duration of each of others of the m sub-bias stages, during the bias stage, the drive transistor is biased in the first sub-bias stage so that the threshold voltage drift of the drive transistor in the non-bias stage can be effectively reduced; subsequently, the drive transistor is biased supplementally and adjusted dynamically according to the bias situation in other sub-bias stages of a shorter duration so that the threshold voltage drift of the drive transistor in the non-bias stage can be sufficiently reduced in the multiple sub-bias stages, thereby ensuring that the duration of the bias stage is not too long.

In an embodiment, in connection with FIGS. 16 and 13, the duration of at least one third interval stage is not equal to the duration of one second interval stage. One third interval stage is a time interval between any two adjacent sub-bias stages, and one second interval stage is a time interval between the bias stage and the data write stage, so the duration of one second interval stage and the duration of one third interval stage may be set flexibly depending on the particular situation. In some embodiments, the duration of one second interval stage is greater than the duration of one third interval stage. In other embodiments, the duration of one second interval stage may be less than the duration of one third interval stage.

In accordance with any of the exemplary embodiments, one data write cycle of the display panel includes S refreshed frames that include a data write frame and a retention frame, where S>0. The data write frame includes a data write stage in which the data write module writes the data signal to the gate of the drive transistor. The retention frame includes no data write stage. At least the data write frame includes the bias stage. In the data write frame, new display data is written to the pixel circuit. In the retention frame, the pixel circuit is normally refreshed, but the display data of the previous frame is retained, and no new display data is written. In the duration of the data write frame, during the bias stage, the data write module and the drive module are on, the compensation module is off, the data signal is written to the drain of the drive transistor from the source of the drive transistor, and the voltage between the gate of the drive transistor and the drain of the drive transistor is biased.

Figure 17:
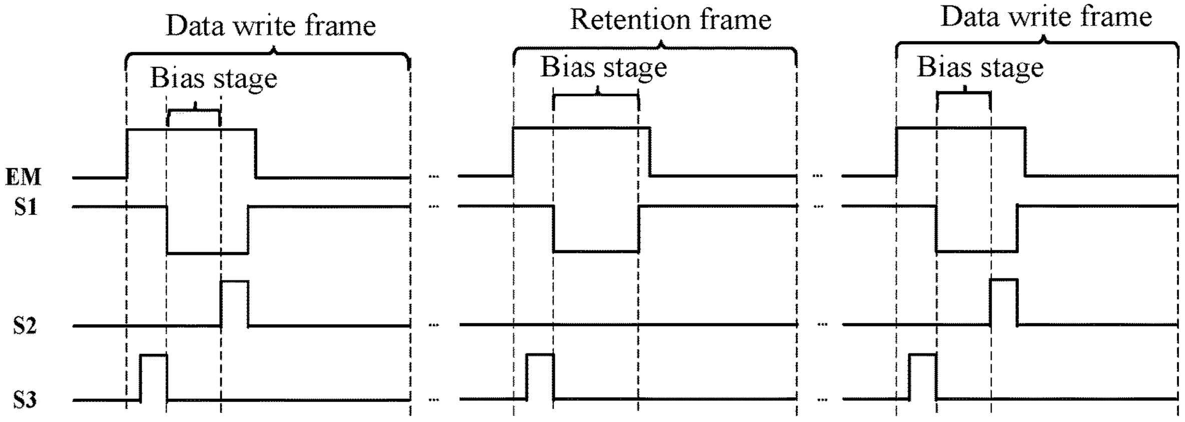
FIG. 17 is an eleventh operation timing diagram of a pixel circuit.

Referring to FIG. 17, an eleventh operation timing diagram of a pixel circuit, in this embodiment, at least one data frame and at least one retention frame include the bias stage; and the duration of the bias stage in at least one retention frame is greater than the duration of the bias stage in the data write frame. In the duration of one retention frame, during the bias stage, the data write module and the drive module are on, the compensation module is off, the data signal is written to the drain of the drive transistor from the source of the drive transistor, and the voltage between the gate of the drive transistor and the drain of the drive transistor is biased. In the retention frame, the previous frame is displayed, the data write stage is not included, and bias adjustment may be performed using a long time. In the data write frame, a new frame is displayed, and thus the normal duration of the light emission stage of the data write frame needs to be ensured. Based on this, the duration of the bias stage in at least one retention frame is greater than the duration of the bias stage in the data write frame so that a better bias effect can be achieved on the premise that displaying is ensured.

Figure 18:
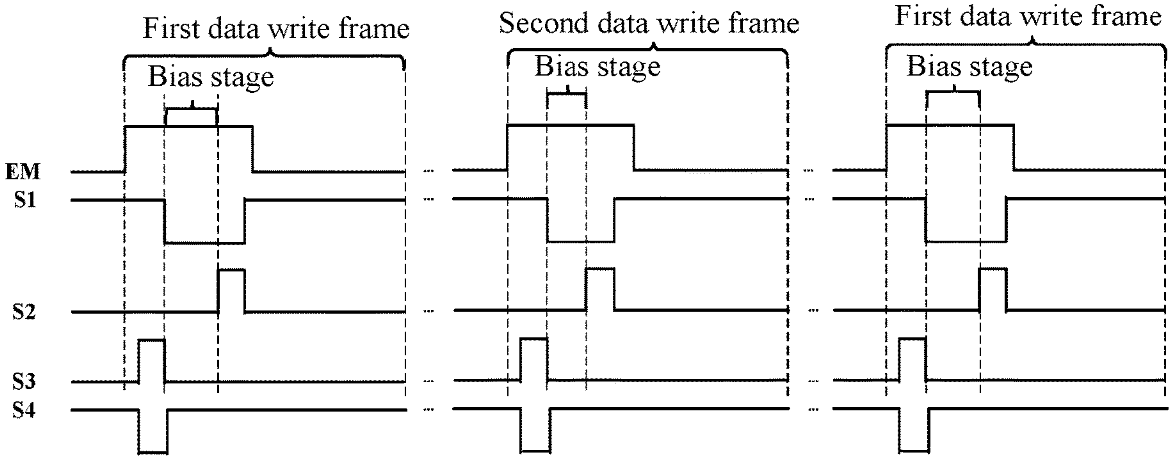
FIG. 18 is a twelfth operation timing diagram of a pixel circuit.

Referring to FIG. 18, a twelfth operation timing diagram of a pixel circuit, the display panel includes at least two data write frames. In the at least two data write frames, bias stages have different durations. The display panel includes a first data write frame and a second data write frame, n second data write frames are included between two adjacent first data write frames, where n≥1; and in the first data write frame, the bias stage has a duration of t7, and in the second data write frame, the bias stage has a duration of t8, where t7>t8≥0.

The display panel includes multiple second data write frames. In one second data write frame, the duration of the bias stage is t8; and during the bias stage, the voltage between the gate of the drive transistor and the drain of the drive transistor is biased, and thus the threshold voltage drift of the drive transistor can be reduced. In practical application, the threshold voltage drift of the drive transistor cannot be reduced to zero during the bias stage of one second data write frame, so the internal characteristics of the drive transistor may be changed after the display panel displays multiple second data write frames for a long time. Based on this, the duration of the bias stage in one first data write frame is set to t7. The duration of the bias stage in one first data write frame is increased so that the threshold voltage drift of the drive transistor accumulated until the current frame is reduced. In this manner, the display effect is improved, and thus the display uniformity is improved.

In some embodiments, the second data write frame may not include the bias stage, that is, t8=0. In this case, not all data write frames require the bias stage, and the bias stage may be set in only the first data write frame, thereby simplifying the driving process of the display panel.

Figure 19:
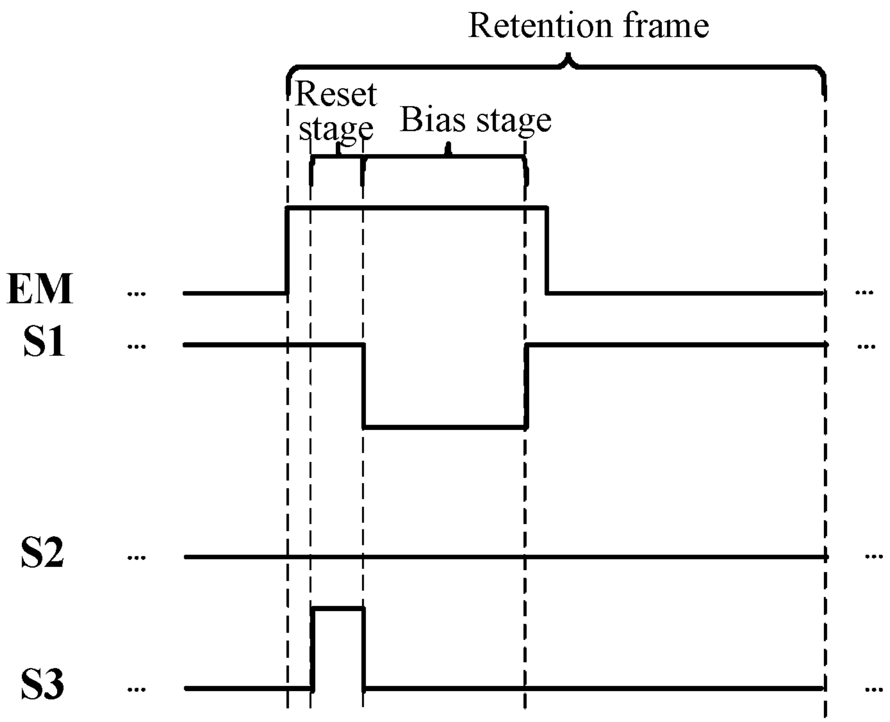
FIG. 19 is a thirteenth operation timing diagram of a pixel circuit.

Referring to FIG. 19, a thirteenth operation timing diagram of a pixel circuit, one data write cycle of the display panel includes S refreshed frames that include a data write frame and a retention frame, where S>0, where at least one retention frame includes the bias stage. In the retention frame, the pre-stage includes a reset stage and the bias stage in sequence. During the reset stage, the gate of the drive transistor receives a reset signal and is reset. The data write stage is not included between the bias stage and the light emission stage. In this embodiment, in the retention frame, the pixel circuit is normally refreshed, but the display data of the previous frame is retained. The retention frame does not include the data write stage, and the previous frame is displayed in the retention frame. In the duration of the retention frame, during the bias stage, the data signal of the previous frame is written to the drain of the drive transistor from the source of the drive transistor, and the voltage between the gate of the drive transistor and the drain of the drive transistor is biased. After the bias stage ends, the retention frame enters the light emission stage so that a picture is displayed. In this manner, the duration of the pre-stage of the retention frame can be shortened, and thus the working duration of the retention frame can be shortened.

Figure 20:
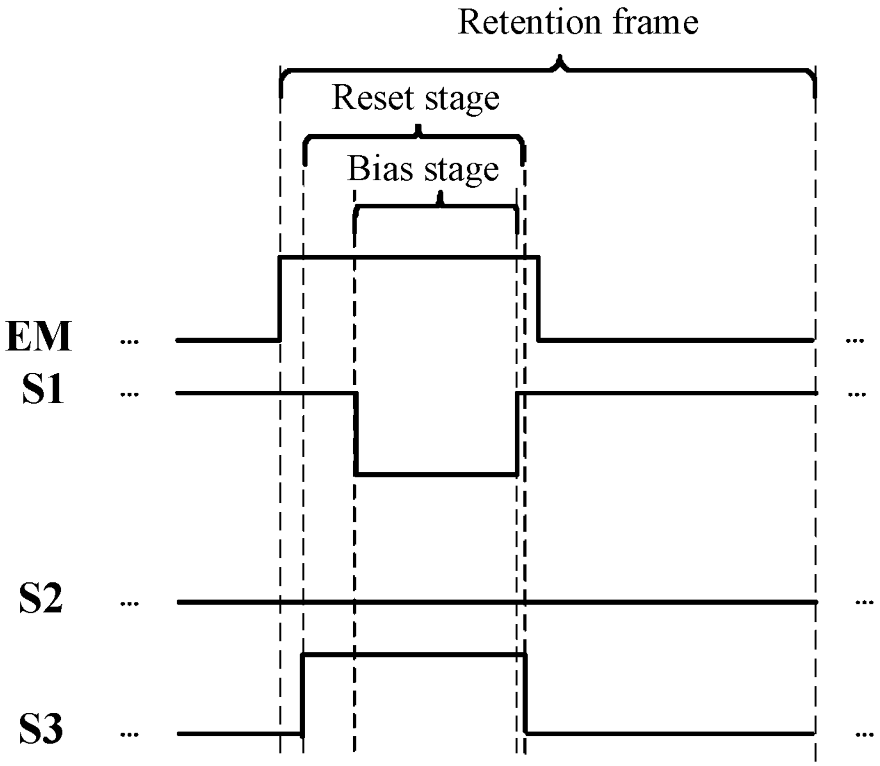
FIG. 20 is a fourteenth operation timing diagram of a pixel circuit.

Referring to FIG. 20, a fourteenth operation timing diagram of a pixel circuit, one data write cycle of the display panel includes S refreshed frames that include a data write frame and a retention frame, where S>0, where at least one retention frame includes the bias stage. In the retention frame, the pre-stage includes a reset stage and the bias stage. During the reset stage, the gate of the drive transistor receives a reset signal and is reset. The time period of the reset stage at least partially overlaps the time period of the bias stage. In this embodiment, the time period of the reset stage at least partially overlaps the time period of the bias stage in the retention frame so that the duration of the pre-stage of the retention frame can be shortened; moreover, during the bias stage, the reset stage is performed so that the drain potential of the drive transistor T0 is adjusted through the data signal while the gate potential of the drive transistor T0 is adjusted through the reset signal so that the bias effect is improved.

It is understood that in this embodiment, it is feasible to configure only the pre-stage of the data write frame to include the bias stage and configure the pre-stage of the retention frame not to include the bias stage. In this case, if the bias problem can be solved by using only the data write frame, the bias stage is not required in the retention frame. Alternatively, it is feasible to configure only the pre-stage of the retention frame to include the bias stage and configure the pre-stage of the data write frame not to include the bias stage. The data write frame also assumes the work of the reset stage and the data write stage, so if the retention frame can fully assume the work of the bias stage, it is not needed to configure the bias stage in the data write frame, thereby simplifying the timing of the data write frame.

Additionally, it is understood that in the preceding drawings, the description is given using an example in which the initialization stage of the light-emitting element at least partially overlaps the reset stage or the bias stage, but this embodiment is not limited to the preceding situation. In some other embodiments, it is feasible that the initialization stage may not overlap the bias stage; or the initialization stage may be performed throughout the bias stage and still performed when the bias stage ends. The design may be flexible depending on the particular situation of the circuit.

Figure 21:
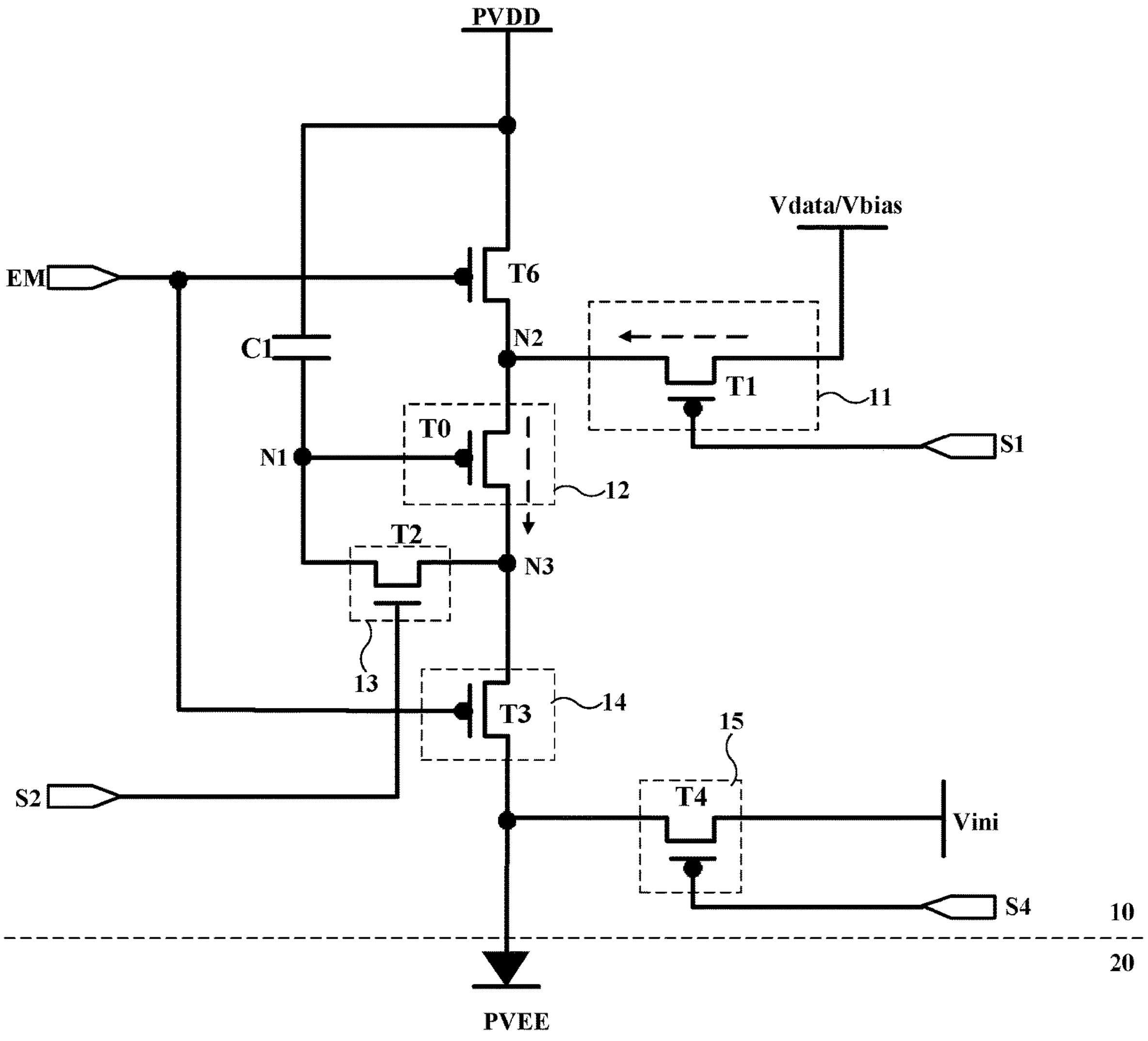
FIG. 21 is a schematic diagram of a pixel circuit of another display panel according to embodiments of the present disclosure.

Another aspect of embodiments of the present disclosure provides a display panel. As shown in FIG. 21, a schematic diagram of a pixel circuit of another display panel according to embodiments of the present disclosure, the display panel includes a pixel circuit 10 and a light-emitting element 20. The pixel circuit 10 includes a data write module 11, a drive module 12 and a compensation module 13. The data write module 11 is configured to selectively provide a data signal for the drive module 12. The drive module 12 is configured to provide a drive current for the light-emitting element 20. The drive module 12 includes a drive transistor T0. The compensation module 13 is configured to compensate for the threshold voltage of the drive transistor T0. The operation of the pixel circuit 10 includes a bias stage. The data write module 11 also serves as a bias module. The data write module 11 is configured to provide a data signal Vdata in a data write stage and provide a bias signal Vbias during the bias stage. During the bias stage, the data write module 11 and the drive module 12 are on, the compensation module 13 is off, and the bias signal is written to the drain of the drive transistor to adjust the bias state of the drive transistor.

Here the bias signal Vbias may be a data signal Vdata provided on a data signal line connected to the pixel circuit 10 or may be an additional bias signal provided by a driver chip. Any bias signal that can be written to the drain of the drive transistor to adjust the bias state of the drive transistor when the data write module and the drive module are on and the compensation module is off is within the scope of this embodiment.

Figure 22:
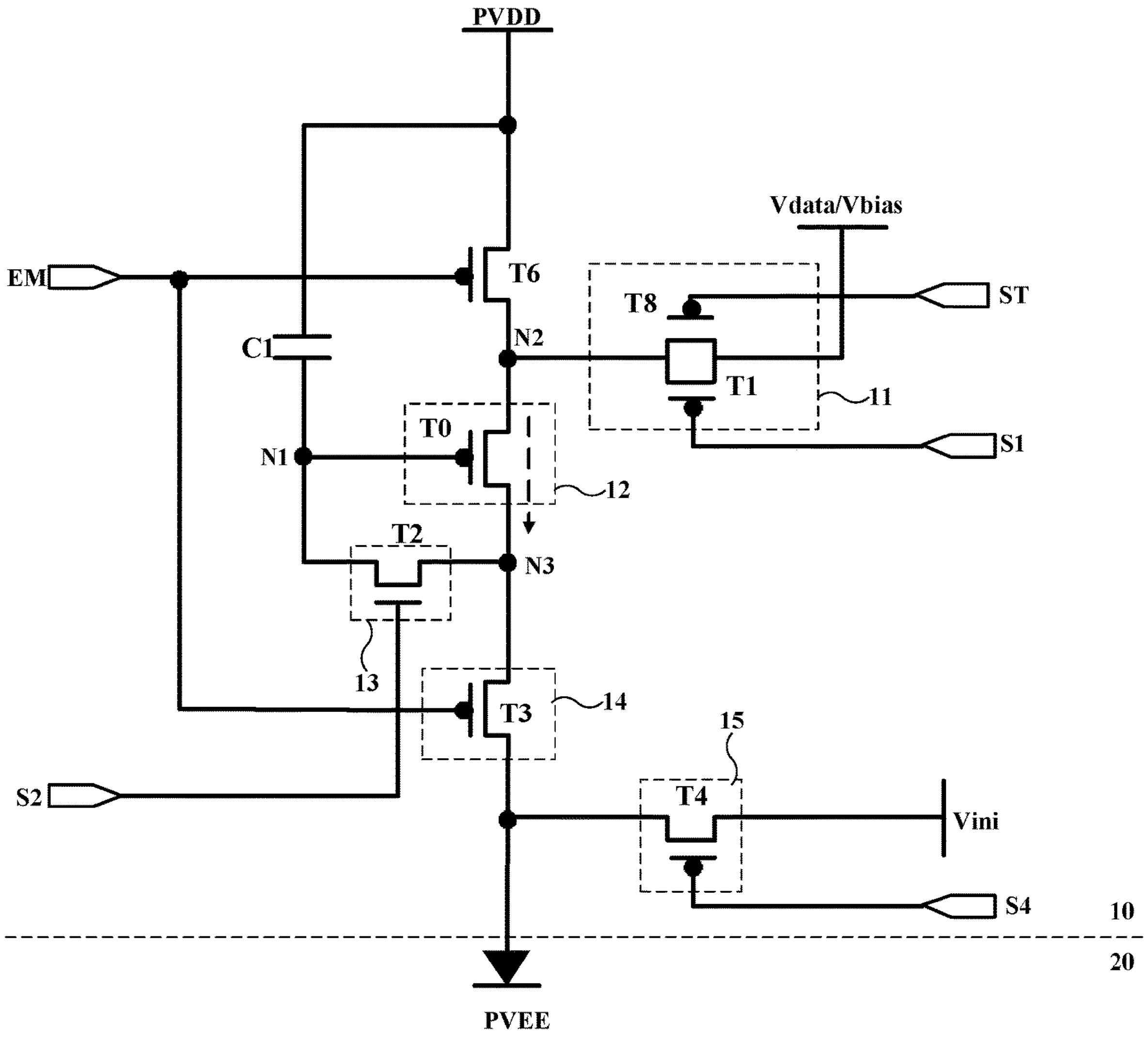
FIG. 22 is a schematic diagram of a pixel circuit of another display panel according to embodiments of the present disclosure.

Shown in FIG. 22 is a schematic diagram of a pixel circuit of another display panel according to embodiments of the present disclosure. A data write module may include a data write transistor T1 and a bias transistor T8. The data write transistor T1 is connected to a data signal input terminal and configured to transmit a data signal Vdata. The bias transistor T8 is connected to a bias signal input terminal and configured to transmit a bias signal Vbias. The control terminal of the bias transistor T8 is connected to a control signal ST so that the bias transistor T8 is controlled to turn on and off.

In an embodiment, during the bias stage, the potential of the bias signal Vbias is greater than the potential of the gate of the drive transistor T0 so that the potential of the drain of the drive transistor T0 is raised, and the threshold voltage drift caused by the potential difference between the gate potential of the drive transistor T0 and the drain potential of the drive transistor T0 is alleviated.

It is understood that FIGS. 21 and 22 illustrate only aspects of the preceding embodiments and do not necessarily include all the elements operating in the circuit.

For the driving mode in the driving process of other embodiments, reference may be made to the driving mode of any one of the preceding embodiments as long as the data signal during the bias stage is replaced with a bias signal. All these are within the scope of the embodiments. Based on this, referring to FIGS. 22 and 5, when the bias transistor T8 and the fifth transistor T5 are of the same type, for example, PMOS or NMOS, the bias control signal ST may be the same as the control signal S3 of the reset module; when the bias transistor T8 and the fourth transistor S4 are of the same type, for example, PMOS or NMOS, the bias control signal ST may be the same as the control signal S4 of the initialization module.

Embodiments of the present disclosure further provide a driving method of a display panel. The display panel includes a pixel circuit and a light-emitting element. The pixel circuit includes a data write module, a drive module and a compensation module. The data write module is configured to selectively provide a data signal for the drive module. The drive module is configured to provide a drive current for the light-emitting element and includes a drive transistor. The compensation module is configured to compensate for the threshold voltage of the drive transistor.

Figure 23:
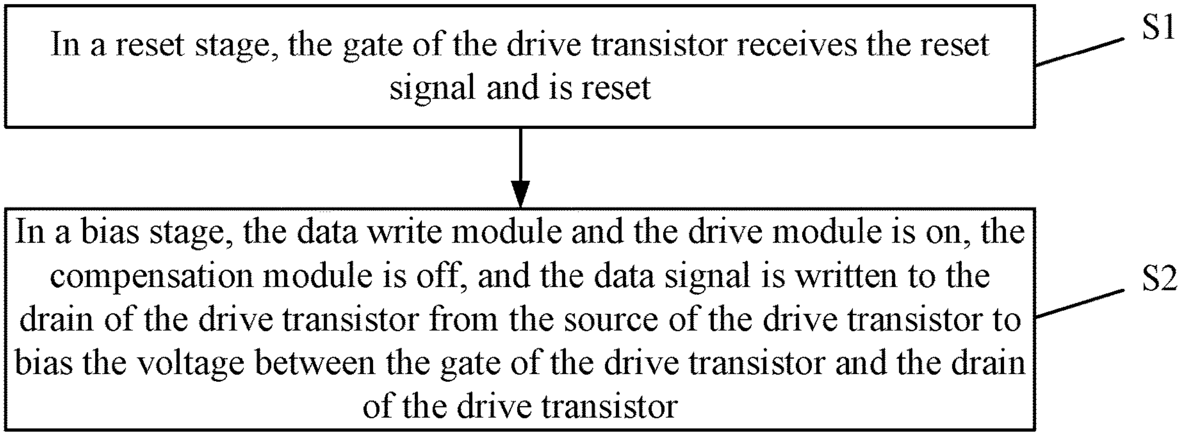
FIG. 23 is a schematic diagram of a driving method of a display panel according to embodiments of the present disclosure.

FIG. 23 is an exemplary flowchart of a driving method of a display panel according to some embodiments of the present disclosure. As shown, the driving method of at least one frame of the display panel includes that in a bias stage S2, the data write module and the drive module are on, the compensation module is off, and the data signal is written to the drain of the drive transistor to adjust the bias state of the drive transistor.

Also as shown in FIG. 23, the driving method S1 of at least one frame of the display panel further includes a reset stage in which the gate of the drive transistor receives a reset signal and is reset.

For the driving method of other embodiments, reference may be made to the driving method used in the driving process of any one of the preceding embodiments. The same content is not repeated in this embodiment. All these are within the scope of the driving method of this embodiment.

In embodiments of the present disclosure, the operation of the pixel circuit includes a bias stage. During the bias stage, the data write module and the drive module are on, the compensation module is off, and the data signal is written to the drain of the drive transistor through the turned-on data write module and drive module to adjust the drain potential of the drive transistor so as to ameliorate the potential difference between the gate potential of the drive transistor and the drain potential of the drive transistor. It is known that the pixel circuit includes at least one non-bias stage. When a drive current is generated in the drive transistor, the gate potential of the drive transistor may be greater than the drain potential of the drive transistor, leading the I-V curve of the drive transistor to shift, causing the threshold voltage of the drive transistor to drift. During the bias stage, the gate potential and the drain potential of the drive transistor are adjusted so that the shift of the I-V curve of the drive transistor in the non-bias stage can be balanced, the threshold voltage drift of the drive transistor can be reduced, and the display uniformity of the display panel can be ensured.

Embodiments of the present disclosure further provide a display device. The display device includes the display panel of any one of the preceding embodiments. Optionally, the display panel is an organic light-emitting display panel or a microLED display panel.

Figure 24:
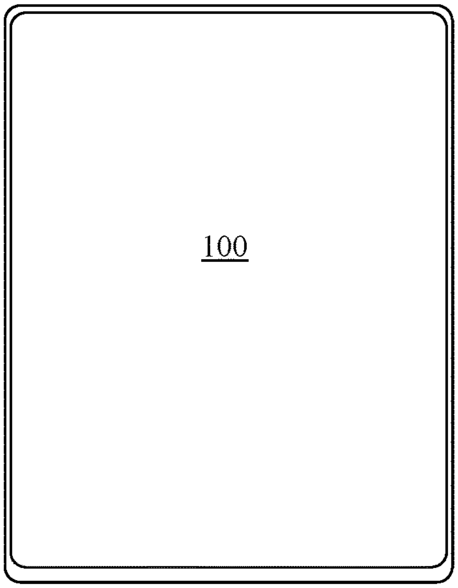
FIG. 24 is a schematic diagram of a display device according to embodiments of the present disclosure.

FIG. 24, a schematic diagram of a display device according to embodiments of the present disclosure, the display device is applicable to an electronic device 100 such as a smartphone or a tablet computer. It is to be understood that the preceding embodiments provide only some examples of the structure of the pixel circuit and the driving method of the pixel circuit, and other structures are also included in the display panel and are not described in detail here.

Figure 25:
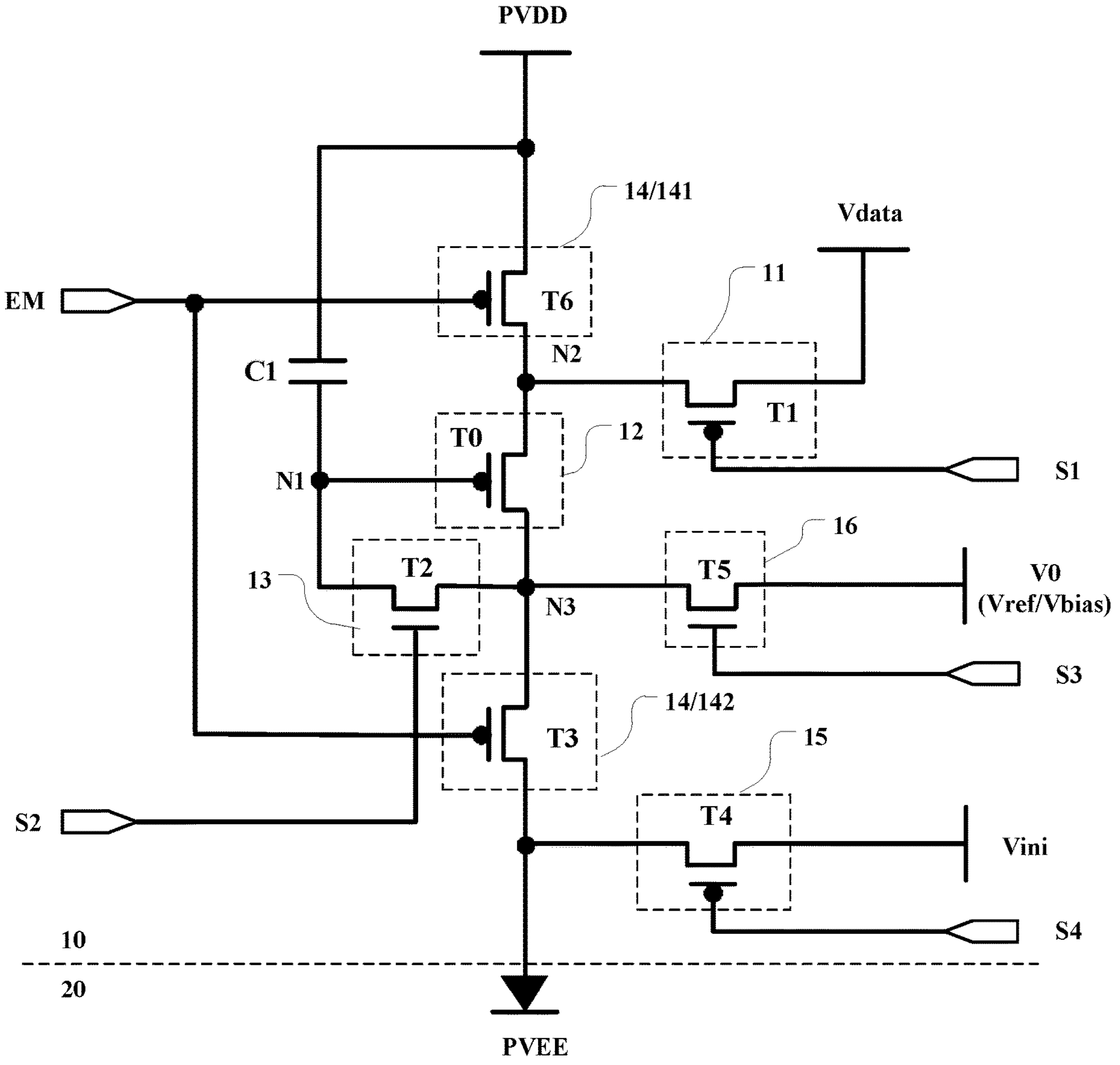
FIG. 25 is a schematic diagram of a pixel circuit of another display panel according to embodiments of the present disclosure.

As shown in FIG. 25, a schematic diagram of a pixel circuit of another display panel according to embodiments of the present disclosure, the display panel includes a pixel circuit 10 and a light-emitting element 20. The pixel circuit 10 includes a data write module 11, a drive module 12, a compensation module 13 and a reset module 16. The data write module 11 is connected between a data signal input terminal and the source of a drive transistor T0 and configured to provide a data signal Vdata for the drive module 12. The drive module 12 is configured to provide a drive current for the light-emitting element 20. The drive module 12 includes the drive transistor T0. The compensation module 13 is connected between the gate of the drive transistor T0 and the drain of the drive transistor T0 and configured to compensate for the threshold voltage of the drive transistor T0. The reset module 16 is connected between a reset signal terminal and the drain of the drive transistor T0 and configured to provide a reset signal Vref for the gate of the drive transistor T0. The reset module 16 also serves as a bias module. The operation of the pixel circuit includes a reset stage and a bias stage. During the reset stage, the reset module 16 and the compensation module 13 are on, and the reset signal terminal provides the reset signal for the gate of the drive transistor T0 so that the gate of the drive transistor T0 can be reset. During the bias stage, the reset module 16 is on, the compensation module 13 is off, and the reset signal terminal provides a bias signal Vbias for the drain of the drive transistor T0 so that the bias state of the drive transistor T0 can be adjusted.

In an embodiment, the control terminal of the data write module 11 is connected to a first scan signal terminal and configured to receive a first scan signal S1. The first scan signal S1 is configured to control the data write module 11 to turn on and off. Further, the data write module 11 includes a first transistor T1 whose gate is connected to the first scan signal terminal, whose source is connected to the data signal input terminal and whose drain is connected to the source of the drive transistor T0. The control terminal of the compensation module 13 is connected to a second scan signal terminal and configured to receive a second scan signal S2. The second scan signal S2 is configured to control the compensation module 13 to turn on and off. Further, the compensation module 13 includes a second transistor T2 whose gate is connected to the second scan signal terminal, whose source is connected to the drain of the drive transistor T0 and whose drain is connected to the gate of the drive transistor T0. The control terminal of the reset module 16 is connected to a third scan signal terminal and configured to receive a third scan signal S3. The third scan signal S3 is configured to control the reset module 16 to turn on and off. Further, the reset module 16 includes a fifth transistor T5 whose gate is connected to the third scan signal S3, whose source is connected to the reset signal terminal and whose drain is connected to the drain of the drive transistor T0.

In this embodiment, the reset module also serves as the bias module. On the one hand, the reset module can provide a reset signal for the gate of the drive transistor during the reset stage. On the other hand, the reset module can provide a bias signal for the drain of the drive transistor during the bias stage. The display panel includes the non-bias stage such as the light emission stage, so when the drive transistor is on, the gate potential of the drive transistor may be higher than the drain potential of the drive transistor. This may cause the Id-Vg curve of the drive transistor to drift, as shown in FIG. 3 of this description, and thereby cause the threshold voltage Vth of the drive transistor to drift. In order for this phenomenon to be ameliorated, the bias stage is configured so that the potential difference between the gate potential of the drive transistor and the source potential of the drive transistor is adjusted, the drift of the Id-Vg curve is reduced, and thereby the drift of the threshold voltage Vth of the drive transistor is reduced.

Referring to FIG. 25, in this embodiment, the pixel circuit 10 further includes a light emission control module 14. The light emission control module 14 is configured to selectively control the light-emitting element 20 to enter a light emission stage. The light emission control module 14 includes a first light emission control module 141 and a second light emission control module 142. The first light emission control module 141 is connected between a first power signal terminal and the source of the drive transistor T0. The second light emission control module is connected between the drain of the drive transistor T0 and the light-emitting element 20. During the bias stage, at least the second light emission control module 142 is off. The light-emitting element 20 is required to not emit light during the bias stage. The second light emission control module 142 is set to be off to ensure that the light-emitting element 20 does not emit light. Optionally, in the bias phase, the first light emission control module 141 may also be set to be off to prevent a first power signal PVDD from affecting the drain voltage of the drive transistor T0 and to ensure that the drain potential of the drive transistor T0 is individually adjusted by the bias signal Vbias. In some special cases, during the bias stage, the first light emission control module 141 may also be on, and the drain potential of the drive transistor T0 is adjusted by both the first power signal PVDD and the bias signal Vbias. However, this situation is applicable to only the case where the control terminal of the first light emission control module 141 and the control terminal of the second light emission control module 142 are controlled by different signals.

Optionally, the control terminal of the first light emission control module 141 is connected to a light emission control signal terminal and configured to receive a light emission control signal EM for controlling the first light emission control module 141 to turn on and off. Further, the first light emission control module 141 includes a sixth transistor T6 whose gate is connected to the light emission control signal terminal, whose source is connected to the first power signal terminal and whose drain is connected to the source of the drive transistor T0; the control terminal of the second light emission control module 142 is connected to the light emission control signal terminal and configured to receive a light emission control signal EM for controlling the second light emission control module 142 to turn on and off. Further, the second light emission control module 142 includes a third transistor T3 whose gate is connected to the light emission control signal terminal, whose source is connected to the drain of the drive transistor T0 and whose drain is connected to the light-emitting element 20.

As shown in FIG. 25, in this embodiment, the pixel circuit 10 further includes an initialization module 15 connected between an initialization signal terminal and the light-emitting element 20 and configured to provide an initialization signal Vini for the light-emitting element 20. In some embodiments, the initialization module 15 is not on during the bias stage. In other embodiments, the initialization module 15 is on in at least part of the time period of the bias stage. The light-emitting element 20 is required not to emit light during the bias stage. However, the transistor may run the risk of having a certain leakage current, causing the light-emitting element 20 to emit light covertly during the bias stage. Nevertheless, in at least part of the time period of the bias stage, the initialization module 15 is on so that the light-emitting element 20 can receive the initialization signal, thereby sufficiently ensuring that the light-emitting element 20 does not emit light.

In an embodiment, the control terminal of the initialization module 15 is connected to a fourth scan signal terminal and configured to receive a fourth scan signal S4 for controlling the initialization module 15 to turn on and off. Further, the initialization module 15 includes a fourth transistor T4 whose gate is connected to the fourth scan signal terminal, whose source is connected to the initialization signal terminal and whose drain is connected to the light-emitting element 20.

In an embodiment, he drive transistor T0 is a PMOS transistor, and the voltage of the bias signal Vbias is higher than the voltage of the reset signal Vref. During the reset stage, the gate voltage of the drive transistor T0 needs to be reset sufficiently to ensure that the drive transistor T0 is on. Therefore, the reset signal Vref is generally a low-level signal. During the bias stage, the drain voltage of the drive transistor T0 needs to be appropriately raised to slow down the threshold voltage drift of the drive transistor T0. Therefore, generally, the voltage of the bias signal Vbias is set higher than the voltage of the reset signal Vref. Based on this, the signal received by the reset signal terminal is switched between the reset signal Vref and the bias signal Vbias. For ease of description, the signal received by the reset signal terminal is collectively referred to as V0.

In an embodiment, the operation of the pixel circuit 10 further includes at least a non-bias stage; during the bias stage, the drive transistor 10 has a gate voltage of Vg1, a source voltage of Vs1 and a drain voltage of Vd1; and in the non-bias stage, the drive transistor has a gate voltage of Vg2, a source voltage of Vs2 and a drain voltage of Vd2.

In some embodiments, $|Vg1-Vd1|<|Vg2-Vd2|$ so that the difference between the gate voltage of the drive transistor T0 and the drain voltage of drive transistor T0 during the bias stage is less than the difference between the gate voltage of the drive transistor T0 and the drain voltage of the drive transistor T0 in the non-bias stage, thereby alleviating the threshold voltage drift of the drive transistor T0.

In some other embodiments, $(Vg1-Vd1)\times(Vg2-Vd2)<0$ so that the potential difference between the gate potential of the drive transistor and the drain potential of the drive transistor T0 in the non-bias stage is reversed during the bias stage, thereby effectively balancing the problem of threshold voltage drift of the drive transistor T0 caused in the non-bias stage.

Further, optionally, $Vd1-Vg1>Vg2-Vd2>0$. Here the difference $Vd1-Vg1$ is set larger, the potential difference between the gate potential of the drive transistor and the drain potential of the drive transistor T0 in the non-bias stage is balanced by a larger reverse potential difference during the bias stage, thereby shortening the time of the bias stage.

In an embodiment, if the bias stage has a duration of t1, and the non-bias stage has a duration of t2, then $(|Vg1-Vd1|-|Vg2-Vd2|)\times(t1-t2)<0$. Here, if $|Vg1-Vd1|$ is greater than $|Vg2-Vd2|$, that is, the reverse potential difference used for biasing is larger, then the time of the bias stage may be set shorter than the non-bias stage; if $|Vg1-Vd1|$ is less than $|Vg2-Vd2|$, that is, the reverse potential difference used for biasing is smaller, then the time of the bias stage may be set longer than the non-bias stage. The purpose of the preceding design is to sufficiently counteract, during the bias stage, the problem of threshold voltage drift of the drive transistor caused in the non-bias stage and to prevent other problems caused by the excessive progress of the bias stage.

In the preceding embodiments, the non-bias stage is the light emission stage of the display panel. During the light emission stage, the drive transistor T0 provides the drive current for the light-emitting element 20. In the pixel circuit shown in FIG. 25, before the light emission stage of the light-emitting element 20, the data signal Vdata is written to the gate of the drive transistor T0 until the gate potential of the drive transistor T0 is (Vdata−Vth). Then, the light emission stage begins. Therefore, during the light emission stage, the gate potential of the drive transistor T0 is a relatively high potential. In some cases, during the light emission stage, for example, the drive transistor T0 has a source potential of 4.6 V, a gate potential of 3 V and a drain potential of 1 V. Therefore, during the light emission stage, the drive transistor T0 is on. However, the gate potential is higher than the drain potential, causing the Id-Vg curve to drift, causing the threshold voltage Vth of the drive transistor T0 to drift. Therefore, in this embodiment, the light emission stage is set as a non-bias stage so that the preceding technical problem caused during the light emission stage can be solved.

In an embodiment, for the duration of one frame of the display panel, the operation of the pixel circuit includes a pre-stage and a light emission stage; and in the duration of one frame of at least one frame, the pre-stage of the pixel circuit includes the bias stage.

Figure 26:
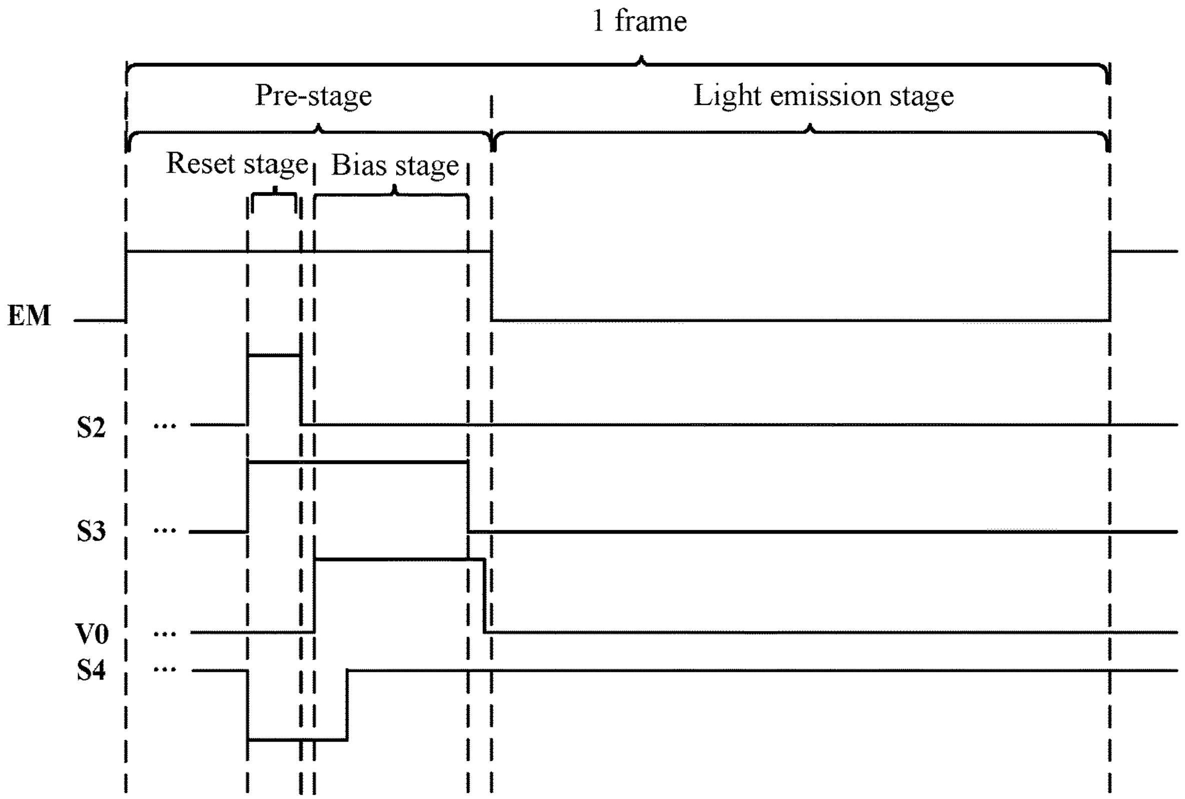
FIG. 26 is one of operation timing diagrams of the pixel circuit of FIG. 25.
Figure 27:
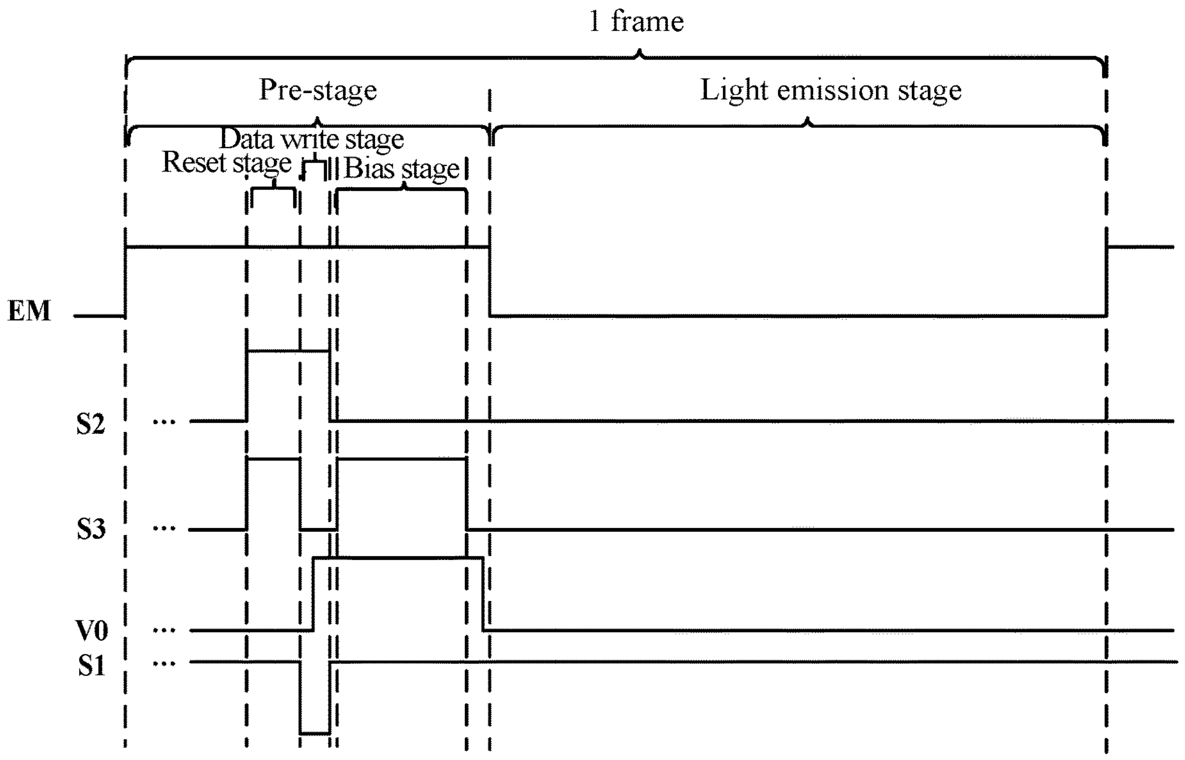
FIG. 27 is one of operation timing diagrams of the pixel circuit of FIG. 25.

FIG. 26 is one of operation timing diagrams of the pixel circuit of FIG. 25, and FIG. 27 is one of operation timing diagrams of the pixel circuit of FIG. 25. In an embodiment, as shown in FIG. 26, in the duration of one frame of the display panel, the operation of the pixel circuit includes a pre-stage and a light emission stage, and the pre-stage includes a reset stage and a bias stage in sequence. During the reset stage, the second scan signal S2 controls the reset module 16 to turn on. Here the fifth transistor T5 in the reset module 16 may be a PMOS transistor or an NMOS transistor, the NMOS transistor may be an oxide semiconductor transistor, and the NMOS transistor is used as an example in the figure. The third scan signal S3 controls the compensation module 13 to turn on. Here the second transistor T2 in the compensation module 13 may be a PMOS transistor or an NMOS transistor, the NMOS transistor may be an oxide semiconductor transistor, and the NMOS transistor is used as an example in the figure. In this case, the reset signal terminal provides the reset signal Vref for the gate of the drive transistor T0 through the turned-on reset module 16 and compensation module 13. In this case, VO is Vref and is a relatively-low-level signal.

When the reset stage ends, the compensation module 13 is turned off. Here, when the compensation module 13 is turned off, that is, at the falling edge of the second scan signal S2, the VO signal at the reset signal terminal rises from the low-level Vref to a relatively-high-level signal Vbias. At this time, the reset module 16 is turned on, the pixel circuit 10 enters the bias stage, and the reset signal terminal provides the bias signal Vbias for the drain of the drive transistor T0. Here, the bias stage is performed at the end of the reset stage so that the duration of the pre-stage is shortened.

In an embodiment, as shown in FIG. 26, when the reset stage ends, the compensation module 13 is turned off first, the VO signal at the reset signal terminal rises from the low-level Vref to the relatively-high-level signal Vbias after a time interval, the reset module 16 is on, and the pixel circuit 10 enters the bias stage. Here a time interval is set between the reset stage and the bias stage to prevent instability of the drive transistor caused by simultaneous switching of multiple signals. The drive transistor is stabilized through the time interval, and then the next operation is performed, so that the stability of the pixel circuit can be improved. In an embodiment, the duration of this time interval is shorter than the duration of the reset stage, or the duration of this time interval is shorter than the duration of the bias stage. This is because this time interval is set for the stabilization of the drive transistor only, and too long a time is not required.

In an embodiment, as shown in FIG. 27, after the reset stage ends, the reset module 16 is turned off, the compensation module 13 is on for a time interval, and the compensation module 13 is turned off after this time interval; at the same time or later, the reset module 16 is turned on again; at the same time or earlier, the VO signal at the reset signal terminal rises from the low-level Vref to the relatively-high-level signal Vbias, and the pixel circuit enters the bias stage. In this process, if signals are switched simultaneously, the time of the pre-stage can be shortened; if signals are switched at time intervals, the drive transistor can be stabilized. The design may be flexible depending on the particular situation.

In an embodiment, as shown in FIG. 27, after the reset stage ends, the time period from the time when the reset module 16 is turned off to the time when the compensation module 13 is turned off includes a data write stage. After the reset stage ends, the first scan signal S1 controls the data write module 11 to turn on, and the data signal Vdata is written to the gate of the drive transistor T0 through the turned-on data write module 11, drive module 12 and compensation module 13. After the data write stage ends, the compensation module 13 is turned off, the reset module 16 is turned on again, and the bias stage is performed.

In an embodiment, the duration of the reset stage is shorter than the duration of the bias stage. This setting is performed for the following reason: The reset stage is set such that the reset signal is written to the gate of the drive transistor, not requiring too long a time; the bias stage is set such that the threshold voltage drift in the non-bias stage is counteracted, requiring a certain duration in which the desired effect can be achieved. Additionally, in the case as shown in FIG. 27, the duration of the data write stage is also shorter than the duration of the bias stage. This setting is performed for the following reason: The data write stage is set such that the data signal is written to the gate of the drive transistor, not requiring too long a time; the bias stage is set such that the threshold voltage drift in the non-bias stage is counteracted, requiring a certain duration in which the desired effect can be achieved.

In the preceding embodiments, the reset stage is set before the bias stage; the gate potential of the drive transistor T0 is reset to a relatively-low-level signal through the reset signal Vref, and then the drain potential of the drive transistor T0 is raised to a relatively-high-level signal through the bias signal Vbias. In this manner, during the bias stage, the purpose of lowering the gate potential of the drive transistor T0 on the one hand and raising the drain potential of the drive transistor T0 on the other hand is achieved. The adjustment is made from two aspects, thereby improving the potential difference between the gate of the drive transistor T0 and the drain of the drive transistor T0, increasing the effect of the bias stage and sufficiently counteracting the threshold voltage drift of the drive transistor T0 in the non-bias stage.

Figure 28:
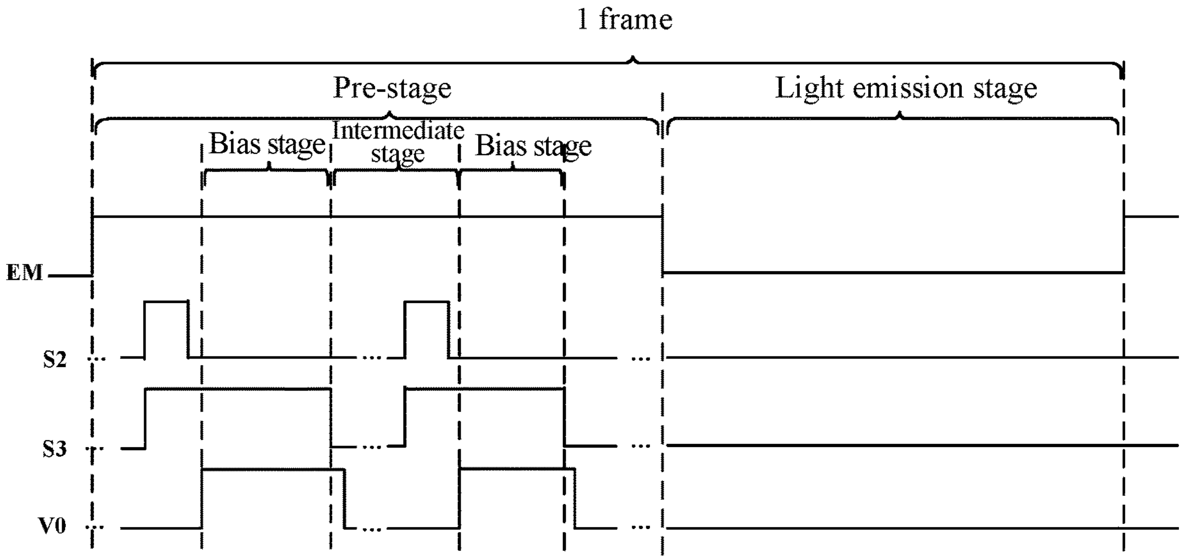
FIG. 28 is one of operation timing diagrams of the pixel circuit of FIG. 25.

Referring to FIG. 28, one of operation timing diagrams of the pixel circuit of FIG. 25, the pre-stage of this embodiment includes N bias stages, where N≥1; and an intermediate stage is included between any two adjacent bias stages of the N bias stages. In the preceding embodiments, the reset stage may be located before the first bias stage at the beginning of the bias stages, that is, the gate of the drive transistor T0 is reset, and then the bias stage begins. Alternatively, the reset stage may be located in an intermediate stage between any two adjacent bias stages, for example, an intermediate stage between the first bias stage and the second bias stage or an intermediate stage between the second bias stage and the third bias stage, that is, at the beginning of the pre-stage, at least one bias stage is performed before the reset stage is performed. Alternatively, the reset stage may be located after the last bias stage of the pre-stage, that is, before the light emission stage; in this case, it is to be noted that after the reset stage, the data write stage must be performed before the light emission stage begins. In the preceding other embodiments, after the reset stage, the data write stage may be performed; or the data write stage may not be performed, and the bias stage begins directly, depending on the particular situation.

Two bias stages are shown in exemplary FIG. 28, but the actual situation is not limited to two. As shown in FIG. 28, in the pre-bias stage, the durations of any two bias stages may be unequal. For example, the duration of the first bias stage is greater than the duration of each of other bias stages. It is to be understood that the first bias stage is the main bias stage and is responsible for counteracting the problem of threshold voltage drift in the non-bias stage, but in order to prevent the bias effect in the first bias stage from being incomplete, other supplementary bias stages may be set to sufficiently supplement the bias effect. Based on this, it is feasible to configure that the durations of the bias stages in the pre-stage decrease sequentially so that a later bias stage can be used to supplement the case where the bias effect of an earlier bias stage is insufficient. Based on the same concept, for example, it is also feasible to configure that the duration of the last bias stage is greater than the duration of each of other bias stages, and, in particular, in the pre-stage, the durations of the bias stages increase sequentially so that the bias effect can be gradually achieved through the bias stages whose durations increase sequentially. Alternatively, according to the preceding concept, it is also feasible to configure that the duration of one bias stage in the middle is greater than the duration of the first bias stage and also greater than the duration of the second bias stage, that is, the bias stage at the end is used as a supplement, and the bias stage in the middle is the main bias stage.

In an embodiment, one data write cycle of the display panel includes S refreshed frames that include a data write frame and a retention frame, where S>0. The data write frame includes a data write stage in which the data write module writes the data signal to the gate of the drive transistor. The retention frame includes no data write stage.

In one implementation, the pre-stage of at least one data write frame includes the bias stage. In this case, as shown in FIG. 27, the data write stage may be performed before the bias stage, may be performed after the bias stage or may be performed between two adjacent bias stages. The data write stage can be performed before the bias stage as long as the data signal is locked to the gate of the drive transistor T0 when the compensation module 13 is off during the bias stage.

In an embodiment, if the duration of the pre-stage is T11, and the sum of the durations of all the bias stages in the pre-stage is T22, as verified by the inventors, when $T22 \leq \frac{2}{3} \times T11$, the following problem can be avoided: The bias stage occupies too long a time of the pre-stage, resulting in an increase in the duration of the pre-stage and a decrease in the refresh rate of the display panel, thereby affecting the display effect.

In another embodiment, the pre-stage of at least one retention frame includes the bias stage. In this case, the pre-stage may include the bias stage and does not include the data write stage. The pre-stage may further include a reset stage, as shown in FIG. 26; or the pre-stage may not include a reset stage, and the bias stage is performed directly. In this case, if the duration of the pre-stage is T11, and the sum of the durations of all the bias stages in the pre-stage is T22, as verified by the inventors, T22 may be set equal to T11, that is, the entire pre-stage is a bias stage; or $T22 \geq \frac{2}{3} T11$. In this manner, the bias stage can be performed by fully using the time of the pre-stage so that the pre-stage is not too long and a better bias effect is achieved.

It is to be understood that in such embodiment, it is feasible to configure only the pre-stage of the data write frame to include the bias stage and configure the pre-stage of the retention frame not to include the bias stage. In this case, if the bias problem can be solved by using only the data write frame, the bias stage is not required in the retention frame. Alternatively, it is feasible to configure only the pre-stage of the retention frame to include the bias stage and configure the pre-stage of the data write frame not to include the bias stage. The data write frame also assumes the work of the reset stage and the data write stage, so if the retention frame can fully assume the work of the bias stage, it is not needed to configure the bias stage in the data write frame, thereby simplifying the timing of the data write frame.

In another embodiment, it is also feasible to configure that both the pre-stage of at least one retention frame and the pre-stage of at least one data write frame include the bias stage so that the work of the bias stage can be performed by both the retention frame and the data write frame, and thus the effect of the bias stage can be ensured, in an embodiment, the duration of one bias stage in the retention frame may be greater than the duration of any one of at least one bias stage in the data write frame; as described above, the pre-stage of the retention frame does not include the data write stage. In this case, the timing is relatively simple, and the time of the bias stage in the retention frame may be set longer, and the time of at least one bias stage in the data write frame may be set shorter, thereby preventing the pre-stage of the data write frame from being too long. Based on this, it is also feasible to set the sum of the durations of the bias stages in the retention frame greater than or equal to the sum of the durations of the bias stages in the data write frame. Further, in an embodiment, the duration of one bias stage in the retention frame is greater than the duration of any one of the bias stages in the data write frame, thereby sufficiently preventing the pre-stage of the data write frame from being too long.

Additionally, in such embodiments, as shown in FIG. 26 and the preceding description, the duration in which the initialization module 15 is on, that is, the initialization stage of the pixel circuit, may not overlap the bias stage or may partially overlap the bias stage; the initialization stage may end at the time when the bias stage ends, may end before the bias stage or may end after the bias stage, depending on the particular situation.

Additionally, in such embodiments, the display panel may further include an integrated chip for providing required drive signals such as the data signal Vdata, the reset signal Vref and the bias signal Vbias for the pixel circuit. Based on the same inventive concept, the integrated chip of this embodiment provides the reset signal Vref for the reset signal terminal during the reset stage of the pixel circuit and provides the bias signal Vbias for the reset signal terminal during the bias stage of the pixel circuit, thereby providing a guarantee for the operation of the pixel circuit of this embodiment. For information about the reset signal Vref and the bias signal Vbias, reference may be made to the description in the preceding embodiments.

Based on the above, for the pixel circuit shown in FIG. 25, embodiments of the present disclosure further provide a driving method of a display panel. The display panel includes a pixel circuit 10 and a light-emitting element 20. The pixel circuit 10 includes a data write module 11, a drive module 12, a compensation module 13 and a reset module 16. The data write module 11 is connected between a data signal input terminal and the source of a drive transistor T0 and configured to provide a data signal Vdata for the drive module 12. The drive module 12 is configured to provide a drive current for the light-emitting element 20. The drive module 12 includes the drive transistor T0. The compensation module 13 is connected between the gate of the drive transistor T0 and the drain of the drive transistor T0 and configured to compensate for the threshold voltage of the drive transistor T0. The reset module 16 is connected between a reset signal terminal and the drain of the drive transistor T0 and configured to provide a reset signal Vref for the gate of the drive transistor T0. The reset module 16 also serves as a bias module.

The driving method of a display panel includes that in a reset stage, the reset module 16 and the compensation module 13 are on, the reset signal terminal provides the reset signal for the gate of the drive transistor T0, and the gate of the drive transistor T0 is reset; in a bias stage, the reset module 16 is on, the compensation module 13 is off, the reset signal terminal provides a bias signal Vbias to the drain of the drive transistor T0, and the bias state of the drive transistor T0 is adjusted.

In other embodiments, the driving method may include the driving method used during the operation of the pixel circuit of any one of the preceding implementations. The same content is not repeated in this embodiment. All these are within the scope of the driving method of this embodiment.

Embodiments of the present disclosure further provide a display device. The display device includes the preceding display panel. For the content of the display device, reference may be made to FIG. 24 of this description and the related description. The related description is not repeated.

In this embodiment, the reset module also serves as the bias module. On the one hand, the reset module can provide a reset signal for the gate of the drive transistor during the reset stage. On the other hand, the reset module can provide a bias signal for the drain of the drive transistor during the bias stage. The display panel includes the non-bias stage such as the light emission stage, so when the drive transistor is on, the gate potential of the drive transistor may be higher than the drain potential of the drive transistor. This may cause the Id-Vg curve of the drive transistor to drift and thereby cause the threshold voltage Vth of the drive transistor to drift. In order for this phenomenon to be ameliorated, the bias stage is configured so that the potential difference between the gate potential of the drive transistor and the source potential of the drive transistor is adjusted, the drift of the Id-Vg curve is reduced, and thereby the drift of the threshold voltage Vth of the drive transistor is reduced.

It is understood the preceding are only exemplary embodiments of the present disclosure and the technical principles used therein. It will be appreciated by those skilled in the art that the present disclosure is not limited to the embodiments described herein. For those skilled in the art, various apparent modifications, adaptations, combinations and substitutions can be made without departing from the scope of the present disclosure. Therefore, while the present disclosure has been described in detail via the preceding embodiments, the present disclosure is not limited to the preceding embodiments and may include equivalent embodiments without departing from the concept of the present disclosure. The scope of the present disclosure is determined by the scope of the appended claims.

What is claimed is:

1. A display panel, comprising:

a pixel circuit and a light-emitting element, wherein the pixel circuit comprises a drive module, a data write transistor and a bias transistor;

wherein the drive module comprises a drive transistor;

wherein the data write transistor is configured to transmit a data signal, and the bias transistor is configured to transmit a bias signal;

wherein an operation of the pixel circuit comprises at least one bias stage, during the bias stage, the bias transistor is on and provides the bias signal;

wherein an operation of the pixel circuit comprises at least one data write frame and at least one retention frame;

wherein a duration of at least one bias stage in at least one retention frame is greater than a duration of at least one bias stage in at least one data write frame;

an operation of the pixel circuit comprises a pre-stage and a light emission stage;

a pre-stage of at least one data write frame comprises at least one bias stage, a duration of the pre-stage is T11, and a sum of durations of bias stages in the pre-stage is T22, wherein $T22 \leq \frac{2}{3} \times T11$.

2. The display panel of claim 1, comprising:

a data signal line for providing the data signal; and a driver chip for providing the bias signal.

3. The display panel of claim 1, wherein a duration of at least one bias stage in at least one retention frame is greater than a duration of any one of bias stages in at least one data write frame.

4. The display panel of claim 1, wherein an operation of the pixel circuit comprises a pre-stage and a light emission stage;

a pre-stage of at least one retention frame comprises at least one bias stage, a duration of the pre-stage is T11, and a sum of durations of bias stages in the pre-stage is T22, wherein T11=T22 or $T22 \geq \frac{2}{3} \times T11$.

5. The display panel of claim 1, wherein a control terminal of the bias transistor is used to receive a bias control signal and turn on or turn off the bias transistor.

6. The display panel of claim 1, wherein the pixel circuit further comprises:

a reset module configured to selectively provide a reset signal for a gate of the drive transistor;

an initialization module configured to selectively provide an initialization signal for the light-emitting element; and a light emission control module configured to selectively control the light-emitting element to enter a light emission stage;

wherein the light emission control module comprises a first light emission control module and a second light emission control module, the first light emission control module is connected between a first power signal terminal and the drive transistor, and the second light emission control module is connected between the drive transistor and the light-emitting element; and wherein during the bias stage, at least the second light emission control module remains off; and/or within at least part of a time period of the bias stage, the initialization module remains on.

7. The display panel of claim 1, wherein the drive transistor is a P-type transistor or the drive transistor is an N-type transistor.

8. The display panel of claim 1, wherein the pixel circuit further comprises a compensation module, a first electrode of the compensation module is connected to an output terminal of the drive module, and a second electrode of the compensation module is connected to a control terminal of the drive module;

wherein during at least one bias stage, the compensation module is off.

9. The display panel of claim 1, wherein the pre-stage of at least one data write frame comprises at least two sub bias stages.

10. A display device comprising the display panel of claim 1.

11. A display panel, comprising:

a pixel circuit and a light-emitting element, wherein the pixel circuit comprises a drive module, a data write transistor and a bias transistor;

wherein the drive module comprises a drive transistor;

wherein the data write transistor is configured to transmit a data signal, and the bias transistor is configured to transmit a bias signal;

wherein an operation of the pixel circuit comprises at least one bias stage, during the bias stage, the bias transistor is on and provides the bias signal;

wherein an operation of the pixel circuit comprises at least one data write frame and at least one retention frame;

wherein a sum of durations of bias stages in at least one retention frame is greater than a sum of durations of bias stages in at least one data write frame.

12. The display panel of claim 11, comprising:

a data signal line for providing the data signal; and a driver chip for providing the bias signal.

13. The display panel of claim 11, wherein a duration of at least one bias stage in at least one retention frame is greater than a duration of any one of bias stages in at least one data write frame;

or an operation of the pixel circuit comprises a pre-stage and a light emission stage;

a pre-stage of at least one retention frame comprises at least one bias stage, a duration of the pre-stage is T11, and a sum of durations of bias stages in the pre-stage is T22, wherein T11=T22 or $T22 > \frac{2}{3} \times T11$.

14. The display panel of claim 11, wherein the pre-stage of at least one data write frame comprises at least two sub bias stages.

15. The display panel of claim 14 wherein an operation of the pixel circuit comprises a pre-stage and a light emission stage;

a pre-stage of at least one data write frame comprises at least one bias stage, a duration of the pre-stage is T11, and a sum of durations of bias stages in the pre-stage is T22, wherein T22≤⅔×T11.

16. The display panel of claim 11, wherein the pixel circuit further comprises:

a reset module configured to selectively provide a reset signal for a gate of the drive transistor;

an initialization module configured to selectively provide an initialization signal for the light-emitting element; and a light emission control module configured to selectively control the light-emitting element to enter a light emission stage;

wherein the light emission control module comprises a first light emission control module and a second light emission control module, the first light emission control module is connected between a first power signal terminal and the drive transistor, and the second light emission control module is connected between the drive transistor and the light-emitting element; and wherein during the bias stage, at least the second light emission control module remains off; and/or within at least part of a time period of the bias stage, the initialization module remains on.

17. The display panel of claim 11, wherein the drive transistor is a P-type transistor or the drive transistor is an N-type transistor.

18. The display panel of claim 11, wherein the pixel circuit further comprises a compensation module, a first electrode of the compensation module is connected to an output terminal of the drive module, and a second electrode of the compensation module is connected to a control terminal of the drive module;

wherein during at least one bias stage, the compensation module is off.

19. A display device comprising the display panel of claim 11.

20. An integrated chip configured to provide at least one signal for a pixel circuit, wherein the pixel circuit comprises:

a pixel circuit and a light-emitting element, wherein the pixel circuit comprises a drive module, a data write transistor and a bias transistor;

wherein the drive module comprises a drive transistor;

wherein the data write transistor is configured to transmit a data signal, and the bias transistor is configured to transmit a bias signal;

wherein an operation of the pixel circuit comprises at least one bias stage, during the bias stage, the data write transistor is off, the bias transistor is on and provides the bias signal;

wherein an operation of the pixel circuit comprises at least one data write frame and at least one retention frame;

wherein a duration of at least one bias stage in at least one retention frame is greater than a duration of at least one bias stage in at least one data write frame, and/or, wherein a sum of durations of bias stages in at least one retention frame is greater than a sum of durations of bias stages in at least one data write frame;

wherein the integrated chip is configured to provide the bias signal to the bias transistor; and/or wherein the integrated chip is configured to provide the data signal to the data write transistor.

* * * * *